United States Patent [19]
Sugawara

[11] Patent Number: 6,021,112
[45] Date of Patent: *Feb. 1, 2000

[54] PATH SWITCHING RING CONTROL APPARATUS IN A SYNCHRONOUS (SDH) NETWORK THAT INCLUDES AN ASYNCHRONOUS (PDH) SUBNETWORK

[75] Inventor: Eiji Sugawara, Kawasaki, Japan

[73] Assignee: Fujitsu LimIted, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,694

[22] Filed: Jan. 8, 1997

[30] Foreign Application Priority Data

Jul. 5, 1996 [JP] Japan ..................... 8-176512

[51] Int. Cl.[7] ............... H04J 1/16; G01R 31/28

[52] U.S. Cl. .......................... 370/222; 371/20.6

[58] Field of Search ................... 370/229, 230, 370/216, 217, 219, 222, 224, 225, 242, 244, 258, 373, 384, 404, 452

[56] References Cited

U.S. PATENT DOCUMENTS

| | | | |
|---|---|---|---|
| 5,491,696 | 2/1996 | Nishimura | 370/222 |
| 5,550,805 | 8/1996 | Takatori et al. | 370/222 |
| 5,570,344 | 10/1996 | Fujii | 370/376 |
| 5,701,293 | 12/1997 | Fujii | 370/244 |
| 5,737,310 | 4/1998 | Goto | 370/222 |

*Primary Examiner*—Huy D. Vu
*Assistant Examiner*—Chiho Andrew Lee
*Attorney, Agent, or Firm*—Helfgott & Karas, P.C.

[57] ABSTRACT

A path switching ring control apparatus is provided for use in a synchronous (SDH) network, and in particular for the purpose of repairing a fault which occurs in an asynchronous (PDH) subnetwork contained therein, this apparatus having a transmission alarm detection section which monitors the input PDH signal and generates a transmission alarm signal when a degradation of the quality thereof is detected, a path overhead generation section which generates the path overhead information of the transmission alarm signal from the transmission alarm detection section, and a path overhead insertion section which inserts the overhead information generated by the path overhead generation section into an SDH signal after the mapping thereof.

9 Claims, 31 Drawing Sheets

Fig.10

|  | P-ALM-W | |
|---|---|---|
|  | NO ALM | ALM |
| P-ALM-E  NO ALM | Fig.11 | EAST SELECTED |
| P-ALM-E  ALM | WEST SELECTED | HOLD |

Fig.11

|  | S-ALM-W | |
|---|---|---|
|  | NO ALM | ALM |
| S-ALM-E  NO ALM | HOLD | EAST SELECTED |
| S-ALM-E  ALM | WEST SELECTED | HOLD |

|  | P-ALM-W | |
|---|---|---|
|  | NO ALM | ALM |
| P-ALM-E NO ALM | Fig. 15 | EAST SELECTED |
| P-ALM-E ALM | WEST SELECTED | HOLD |

Fig.15

| R-ALM-E \ R-ALM-W | NO ALM | ALM(LOF/AIS/SF) | ALM(SD) |
|---|---|---|---|
| NO ALM | HOLD | EAST SELECTED | EAST SELECTED |
| ALM(LOF/AIS/SF) | WEST SELECTED | HOLD | WEST SELECTED |
| ALM(SD) | WEST SELECTED | EAST SELECTED | HOLD |

Fig.27

|  | P-ALM-W | |
|---|---|---|
|  | NO ALM | ALM |
| P-ALM-E  NO ALM | Fig.28 | EAST SELECTED |
| P-ALM-E  ALM | WEST SELECTED | HOLD |

Fig.28

|  | S-ALM-W | |
|---|---|---|
|  | NO ALM | ALM |
| S-ALM-E  NO ALM | Fig.29 | EAST SELECTED |
| S-ALM-E  ALM | WEST SELECTED | HOLD |

Fig. 29

| R-ALM-E \ R-ALM-W | NO ALM | ALM(LOF/AIS/SF) | ALM(SD) |
|---|---|---|---|
| NO ALM | HOLD | EAST SELECTED | EAST SELECTED |
| ALM(LOF/AIS/SF) | WEST SELECTED | HOLD | WEST SELECTED |
| ALM(SD) | WEST SELECTED | EAST SELECTED | HOLD |

Fig.34

|  | P-ALM-W | |
|---|---|---|
|  | NO ALM | ALM |
| P-ALM-E NO ALM | Fig.35 | EAST SELECTED |
| P-ALM-E ALM | WEST SELECTED | HOLD |

Fig.35

|  | S-ALM-W | |
|---|---|---|
|  | NO ALM | ALM |
| S-ALM-E NO ALM | Fig.36 | EAST SELECTED |
| S-ALM-E ALM | WEST SELECTED | HOLD |

Fig. 36

| | | R-ALM-W | | |
|---|---|---|---|---|
| | NO ALM | ALM(LOF/AIS/SF) | ALM(SD) | |
| | | Fig.37 | EAST SELECTED | EAST SELECTED |
| | NO ALM | WEST SELECTED | HOLD | WEST SELECTED |
| R-ALM-E | ALM(LOF/AIS/SF) | WEST SELECTED | EAST SELECTED | HOLD |
| | ALM(SD) | | | |

Fig.37

|  | | P-ACT-W | |
|---|---|---|---|
|  | | Y | N |
| P-ACT-E | Y | HOLD | EAST SELECTED |
|  | N | WEST SELECTED | HOLD |

PATH SWITCHING RING CONTROL APPARATUS IN A SYNCHRONOUS (SDH) NETWORK THAT INCLUDES AN ASYNCHRONOUS (PDH) SUBNETWORK

BACKGROUND OF THE INVENTION

1. Field of the Invention

The present invention relates to a path switch ring (PSR) method in an SDH (synchronous digital hierarchy) network, and more particularly it relates to a path switch ring control apparatus which is capable of repairing a fault that occurs in a PDH subnetwork in the case in which a PDH (presiochronous digital hierarchy) subnetwork of a PDH network PDH is connected to the above-noted SDH transmission network.

2. Description of Related Art

In an SDH transmission network, for the purpose of repairing, for example, a circuit fault, an MSP (multiplex section protection) method which features redundant signal transmission lines is used, or the transmission path is configured as a ring, and a path switch ring (PSR) which has redundancy by the use of a VC (virtual container) is used. In both systems service is continued when a fault occurs in the transmission path, the MSP system being used in linear optical trunk networks between large cities, and the PSR system being used in networks performing complex transmission within a city.

In a path switch ring network, in the case, for example, in which service is being provided by two network elements (NEs) a and b via the respective SDH interface points on the ring transmission path, the transmitting-side NEa transmits the same signal to the receiving-side NEb both clockwise and counterclockwise on both VCs, and at the receiving-side NEb a path switching function is used to select the one of the given signals that has the better quality by comparing the circuit quality of each. In this case, even if a circuit fault occurs on one of the directions (clockwise or counterclockwise), service is continued because it is possible to select the other, normal, transmission path.

The SDH frame is the basic unit for processing of multiplexed, cross-networked digital signals, and is formed by a section overhead (SOH) of 9 octets and a 261-octet virtual container (VC). In a path switch ring (PSR) in the past, by monitoring a circuit quality monitoring byte (B3), a path trace byte (J1) and a signal label byte (C2) which are included in the path overhead (POH) of, for example, the virtual contain 4 (VC-4), the path having the better circuit quality was selected.

However, in the above-noted ring network, because a terminal on the VC path which uses a path switching function other than at the service access point was not allowed, a first problem arises in that, in the case in which an existing PDH network is used as part of a redundant route (clockwise or counterclockwise) of the SDH ring network, or if a redundant route is connected to a PDH network of a different network supplier, it was not possible to detect a fault which occurs within that PDH network at the SDH network side. In this case, it is not possible to select a proper path at the SDH network side, and an interruption of service occurred.

A second problem that arose was that, in the case in which an additional cross-connect apparatus (PDH DXC: PDH digital exchange) exists in the above-noted PDH subnetwork, if a path setting error occurs at that cross-connect apparatus, it causes an erroneous signal to be provided to the service access point on the SDH network side, resulting in even more difficulty in detecting the above-noted fault.

Yet a third problem that arose was that in the case in which an additional SDH ring subnetwork was encompassed within and connected to the above-noted PDH subnetwork, if a fault occurred in the PDH subnetwork, because the above-noted fault signal is sent in both the clockwise and counterclockwise directions on the SDH ring subnetwork, at the receiving-side network element (NE), the delay in the signals from each direction causes unnecessary path switching (PSW) or unnecessary notification of this event to a host apparatus.

Yet a fourth problem that arose was that, because of the connection between the SDH network and the PDH subnetwork, PDH/SDH multiplexing and demultiplexing on a path which passes therethrough exhibits mapping/demapping jitter, this jitter accumulating to cause degradation of the circuit quality.

SUMMARY OF THE INVENTION

In consideration of the above-noted problems, an object of the present invention is to provide a path switch ring control apparatus which restores service even in the case in which the above-noted type of fault occurs in a PDH subnetwork of an SDH ring network of which it is a part, which acts to deter the above-noted type of unnecessary path switching, and which also when the circuit is normal, to avoid the above-noted circuit degradation, automatically selects a path which does not include a PDH subnetwork.

The present invention is a path switch ring control apparatus in an SDH network which includes a PDH subnetwork, this apparatus having as basic constitutional elements two bi-directional SDH interface sections which interface to the above-noted SDH network, a path switching section to which an SDH signal received by the above-noted two SDH interfaces is input and which selects one thereof, a receiving-side function section which demaps the SDH signal from the above-noted path switching section to a PDH signal and which outputs this PDH signal, and a transmitting-side function section which maps the input PDH signal to an SDH signal and which applies this SDH signal to the above-noted SDH interface sections as a transmission signal.

According the present invention, the above-noted transmitting-side function section has a transmission alarm detection section which monitors the above-noted input PDH signal and which generates a transmission alarm signal when it detects degradation of the quality of the PDH signal, a path overhead generation section which generates the path overhead information of the transmission alarm signal from the above-noted transmission alarm detection section, and a path overhead insertion section which inserts the path overhead information generated by the above-noted path overhead generation section into the path overhead of the SDH signal after the above-noted mapping.

According to the present invention, the above-noted transmitting-side function section further has a frame detection section which detects from the frame signal of the above-noted input PDH signal the bit position at which the prescribed trace data is inserted and which generates the timing for the reading in of that trace data, and a path trace section which reads in the above-noted trace data according to the trace data read-in timing from the above-noted frame detection section, compares that trace data with the expected trace data received values, and if these do not coincide outputs a non-coincidence alarm signal, the above-noted transmission alarm detection section further generating the above-noted transmission alarm signal, which includes the above-noted non-coincidence alarm signal from the above-noted path trace section.

The above-noted path trace section, rather than comparing the above-noted trace data and trace data expected received values, outputs the above-noted trace data as is, the above-noted path overhead generation section generating the path overhead information of the trace data from the above-noted path trace section and the above-noted transmission alarm signal. In the above-noted path overhead generation section, there is, further, a path switch function active message which is set for the purpose of passing through the above-noted PDH subnetwork, the above-noted path overhead generation section generating the path overhead information of this path switch function active message.

According to the present invention, the above-noted path switching section has a path switch section which selects one of the SDH signals received by the above-noted SDH interface sections, a path monitor section which monitors the path overhead of the SDH signals received at the above-noted two SDH interfaces, and which when it detects transmission alarm information which indicates a degradation of the quality of the PDH signals on the above-noted PDH subnetwork outputs transmission alarm detection signals which correspond to each of the above-noted received signals, and a path switch control section to which is provided the above-noted transmission alarm detection signals which correspond to each of the above-noted received signals, and which performs switching control of the above-noted path switch section so as to select the side on which the above-noted transmission alarm has not been detected.

The above-noted path monitor section, rather than, or in addition to, monitoring the path overhead of each SDH signal, monitors the information within the virtual container of each of the SDH signals and, if it detects transmission alarm information which indicates a degradation of quality in the PDH signal on the above-noted PDH subnetwork, outputs a transmission alarm detection signal which corresponds to each of the above-noted received signals. The above-noted path monitor section further has a path check section which monitors the transmission alarm signals which correspond to each of the above-noted received signals provided by from the above-noted path monitor section to the path switch control section and, in the case in which the duration of the above-noted transmission alarm signal is longer than a prescribed amount of time, prohibits a switching operation of the above-noted path switch control section.

The above-noted path monitor section, rather than detecting a transmission alarm which indicates a degradation of quality of the PDH signal on the above-noted PDH subnetwork, when it detects a path switch function active message for the purpose of judging passage through the above-noted PDH subnetwork, outputs a path switch function active message, the above-noted path switch control section performing switching control of the path switch section so as to select the side for which the above-noted path switch function active message detection signal was output.

In addition, in according to the present invention, the above-noted receiving-side function section has a path overhead detection section which extracts the path overhead of the SDH signal from the path switching section and detects the prescribed path trace information from this path overhead, a trace memory section into which is set trace data based on the path trace information detected at the above-noted overhead detection section, a frame detection section which detects a frame signal from the above-noted demapped PDH signal and generates the timing for the purpose of insertion of path trace data into the prescribed bit position of the above-noted PDH signal, and a trace insertion section which outputs the above-noted PDH signal after insertion thereinto, at the above-noted prescribed bit position, of the path trace data from the above-noted trace memory section based on the insertion timing from the above-noted frame detection section.

The path trace information detected by the above-noted path overhead detection section can be set directly into the above-noted trace memory section as the above-noted trace data. The above-noted path trace information comprises the path trace byte (J1), the signal fail byte (B3), or the signal label byte (C2) of the SDH signal.

BRIEF DESCRIPTION OF THE DRAWINGS

The present invention will be more clearly understood from the description as set forth below, with reference being made to the accompanying drawings, wherein:

FIG. 10 is a drawing which shows an example of P-ALM processing;

FIG. 11 is a drawing which shows an example of S-ALM processing;

FIG. 15 is a drawing which shows an example of S-ALM processing;

FIG. 27 is a drawing which shows an example of P-ALM processing in FIG. 26;

FIG. 28 is a drawing which shows an example of S-ALM processing in FIG. 26;

FIG. 29 is a drawing which shows an example of R-ALM processing in FIG. 26;

FIG. 34 is a drawing which shows an example of P-ALM processing in FIG. 33;

FIG. 35 is a drawing which shows an example of S-ALM processing in FIG. 33;

FIG. 36 is a drawing which shows an example of R-ALM processing in FIG. 33;

FIG. 37 is a drawing which shows an example of P-ACT processing in FIG. 33;

DESCRIPTION OF THE PREFERRED EMBODIMENTS

First, before describing the embodiments of the present invention, related art will be generally described, with reference being made to FIGS. 1 through 4.

Figure 1:
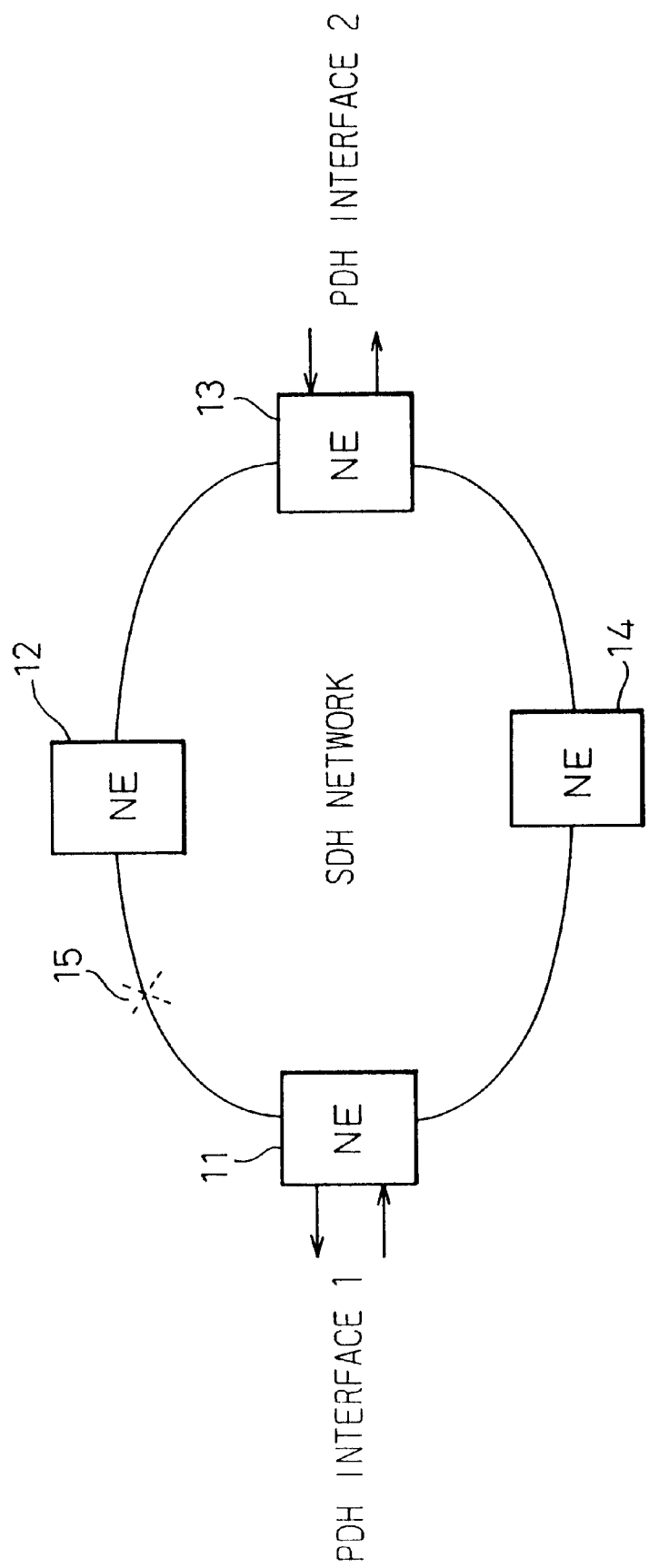
FIG. 1 is a block diagram which shows an example of the configuration of an SDH path switch ring network.

FIG. 1 is a block diagram which shows an example of the configuration of an SDH path switch ring network.

In the example shown in FIG. 1, of the four network elements, NE 11 through NE 14 of the SDH path switch ring network, service is provided via the PDH interface points 1 and 2 between NE 11 and NE 13.

In the case in which the network is operating normally, NE 11 and NE 13 send the same signal to over the virtual container (VC) paths to both NE 12 and NE 14, the path switch function (PSW) being used to selectively receive the signal of the two signals from NE 12 and NE 14 which has the better circuit quality. In the case in which a fault 15 occurs between the NE 11 and the NE 12, service between the above-noted NE 11 and NE 13 is continued by the normal route via NE 14 by means of the above-noted path switch function.

Figure 2:
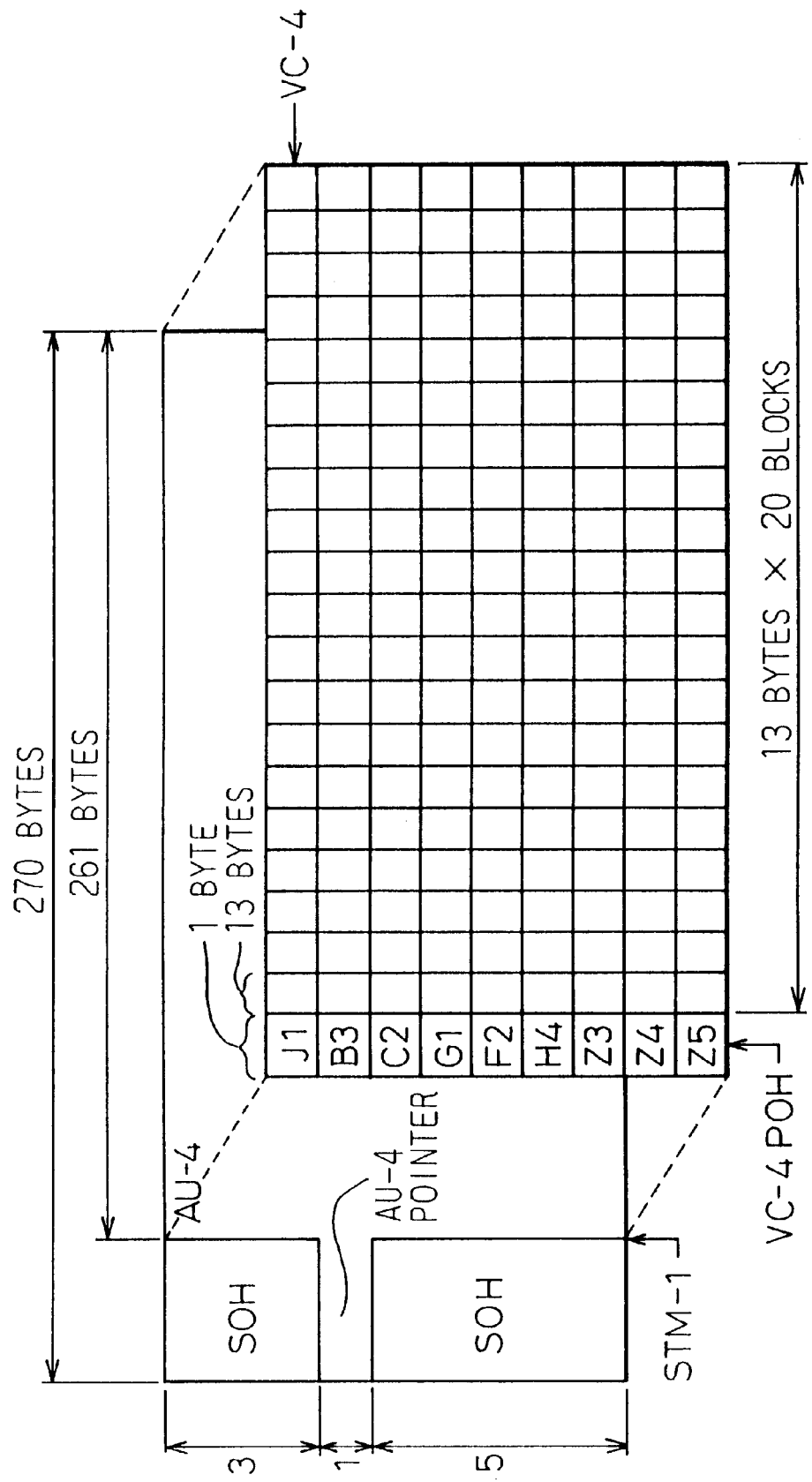
FIG. 2 is a drawing which shows the basic configuration of an SDH frame.

FIG. 2 shows the basic configuration of an SDH frame.

As shown in FIG. 2, the SDH frame is the basic processing unit for multiplexing and cross-connecting of a digital signal, this being formed by a 9-octet section overhead (SOH) and a 261-octet virtual container (VC-4). In a synchronous digital network, in executing a network operation, operation information is divided into section overhead (SOH) which corresponds to a section, and path overhead (POH) which corresponds to one octet, these being applied respectively to an STM (synchronous transport module) and a VC (virtual container).

An AU (administrative unit) 4 pointer is used for the purpose of identifying the first octet of the virtual container (VC-4). The J1 (path trace), B3 (signal fail), and C2 (signal label) bytes of the path overhead (POH) of the virtual container (VC-4) are used in connection with the present invention for the purpose of judging the circuit quality.

Figure 3:
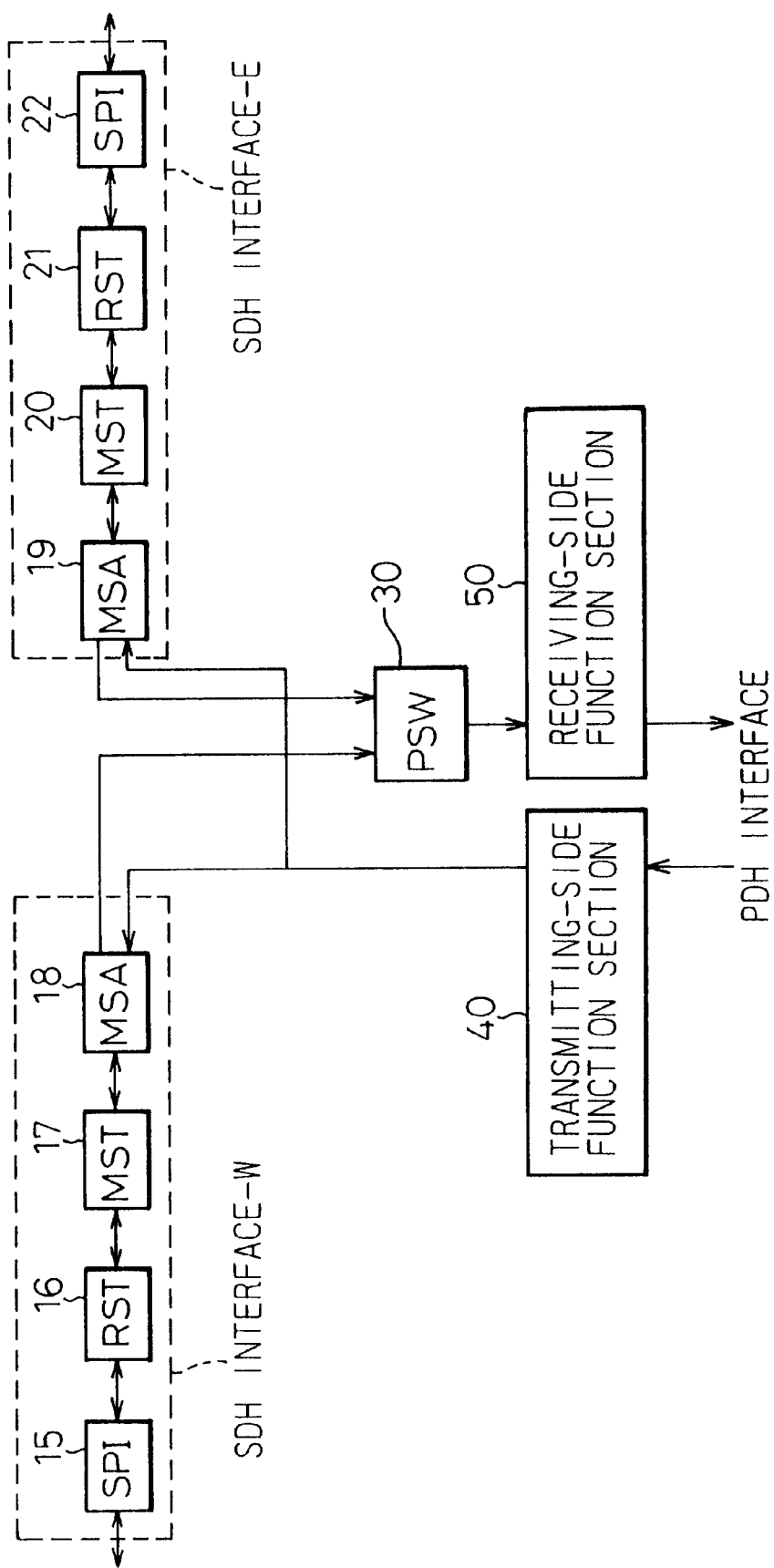
FIG. 3 is a drawing which shows an example of the configuration of a path switch ring control apparatus in an SDH network.

FIG. 3 shows an example of the configuration of a path switching ring control apparatus in a SDH network to which the present invention is directed.

In FIG. 3, the specific example shown is that of ADM (add-drop multiplexing) which has a cross-connect function. The above-noted apparatus is in general configured from the SDH interface sections for the two directions (W: West, E: East) which are enclosed by dashed lines, a path switching (PSW) section 30 which selects one signal from these two directions, a receiving-side function section 50 which demaps the SDH signal selected by the above-noted path switching (PSW) section 30 to a PDH signal and outputs this signal, and a transmitting-side function section 40 which maps a PDH signal to an SDH signal and outputs this signal.

The above-noted SDH interface-E and SDH interface-W sections are further configured from SPI (synchronous physical interface) sections 22 and 15, MST (multiplex section termination) sections 20 and 17, RST (regenerator section terminator) sections 20 and 17, and MSA (multiplex section adaptation) sections 19 and 18, respectively, these executing the multiplexing/demultiplexing function of a VC signal/STM-n signal as specified by ITU-Y G. 783. The above-noted sections are not directly related to the present invention, and will therefore not be further described herein.

Figure 4:
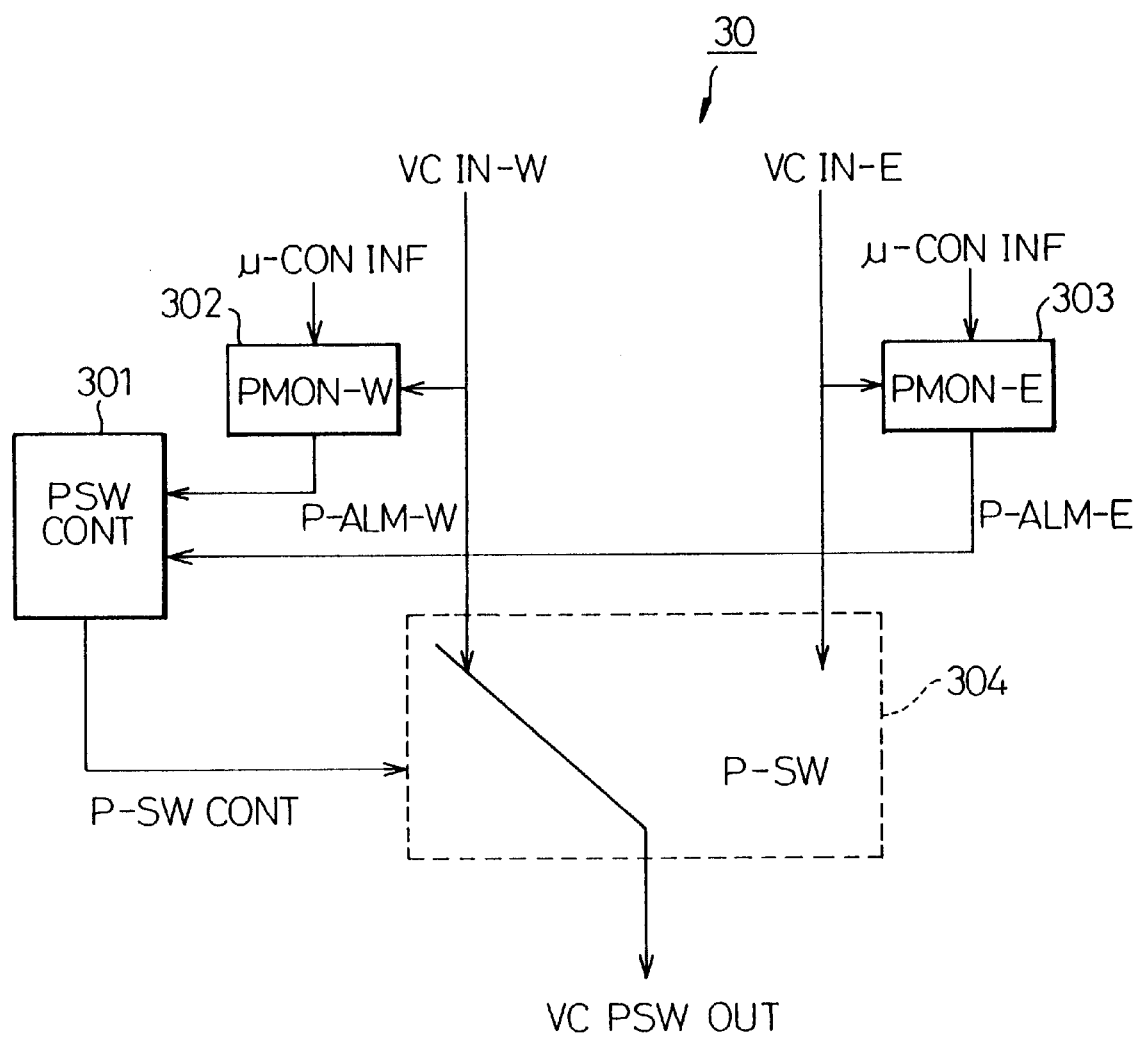
FIG. 4 is a basic block diagram of the path switching (PSW) section shown in FIG. 3.

FIG. 4 is a basic block diagram of the path switching (PSW) section 30 of FIG. 3.

In FIG. 4, the path monitor sections (PMON-W, and PMON-E) 302 and 303 monitor the path overhead (POH) of the VC path signals (VCIN-W and VCIN-E), respectively, received via the SDH interface sections shown in FIG. 3, and if as a result a fault is detected, a corresponding path alarm signal (P-ALM-W and P-ALM-E) is sent to the path switch control section (PSW (CONT) 301 as notification. The above-noted path alarm signals include items such as path trace mismatch and signal label mismatch, which are set forth in ITU-TG.783 Tables 4–7 and 4–10.

From an SEMF (synchronous equipment management function) (not shown in the drawing) an expected received value is given via the above-noted path monitor sections 302 and 303 to a microcomputer interface (μ-CON INF) for the purpose of detecting a path trace mismatch or a signal label mismatch of the above-noted alarm items. The path switch control (PSW) section 301 performs switching of the path switch (P-SW) section 304, in accordance with the above-noted path alarm signals (P-ALM-W, and P-ALM-E). As a result, the above-noted path switch section 304 selectively outputs (VC PSW OUT) one of the two VC path signals (VCIN-W, VCIN-E).

Next, embodiments of a path switch ring control apparatus will be described, keeping the above-described basic configuration in mind.

FIGS. 5 through 15 show the an embodiment of a path switch ring control apparatus according to the present invention for the purpose of solving the first above-described problem.

Figure 5:
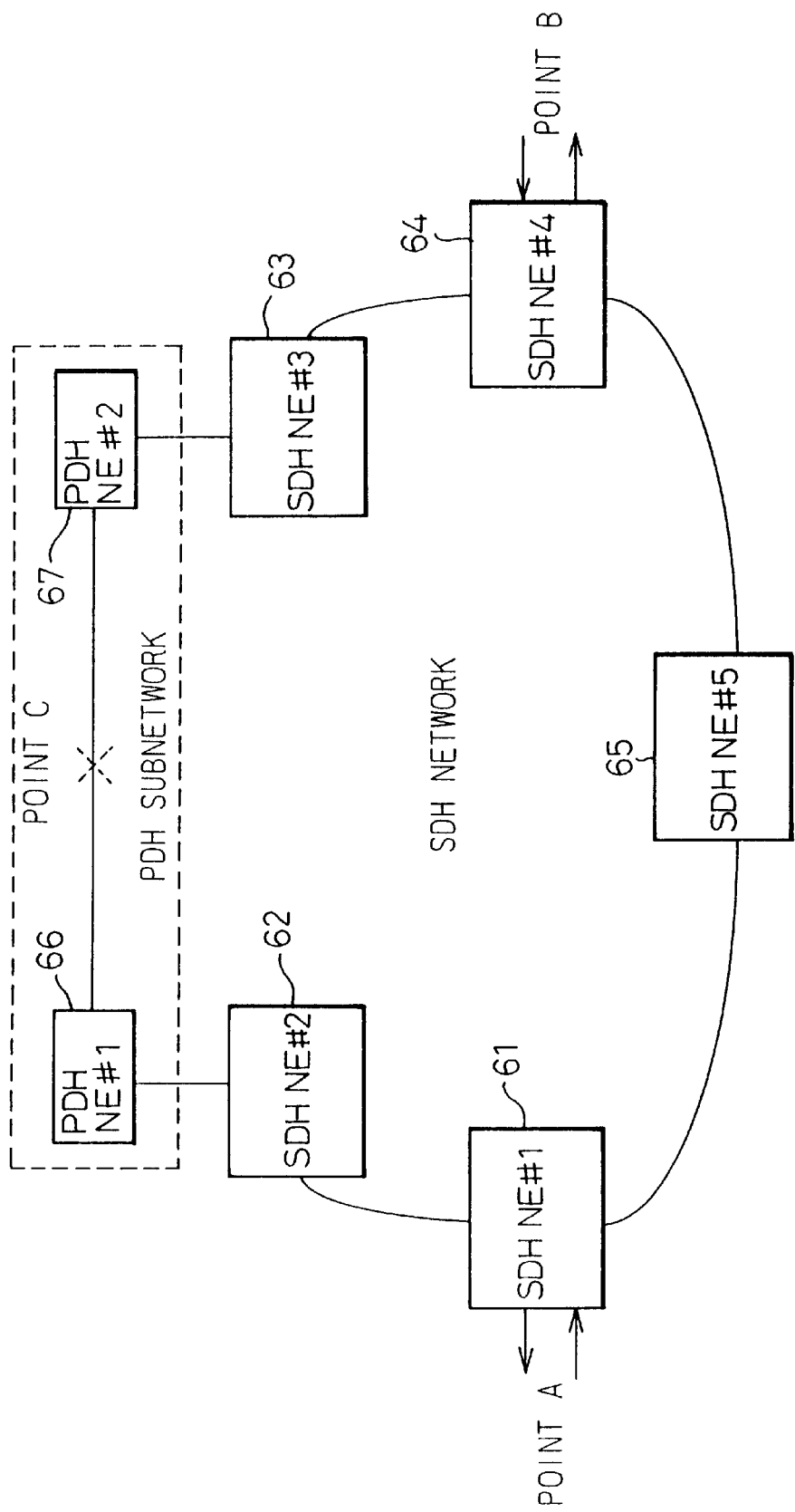
FIG. 5 is a drawing which shows an example of the configuration of an SDH network which includes a PDH subnetwork.

FIG. 5 shows an example of an SDH network which includes a PDH subnetwork.

In the case shown in FIG. 5, the PDH subnetwork enclosed by the dashed line is connected to part of the SDH ring network. In this case, the service access points are point A and point B of the network elements (SDH NE#1) 61 and (SDH NE#4) 64, respectively. In this case, at the network elements (SDH NE#2) 62 and (SDH NE#3) 63 on the side of the SDH side is connected to the above-noted PDH subnetwork, a VC path with respect to the opposing SDH network elements (SDH NE#1) 61 and (SDH NE#4) 64 is terminated.

In the case in which a fault occurs at point C of the PDH subnetwork at a time when the path from the network element (SDH NE#2) 62 in the counterclockwise direction from the network element (SDH NE#1) 61 of the service access point A, in this condition it is not possible for the network element (SDH NE#1) 61 to detect this fault. Therefore, path switching at the network element (SDH NE#1) 61 is not performed, and there is an interruption of service in the direction from service access point B to point A.

Figure 6:
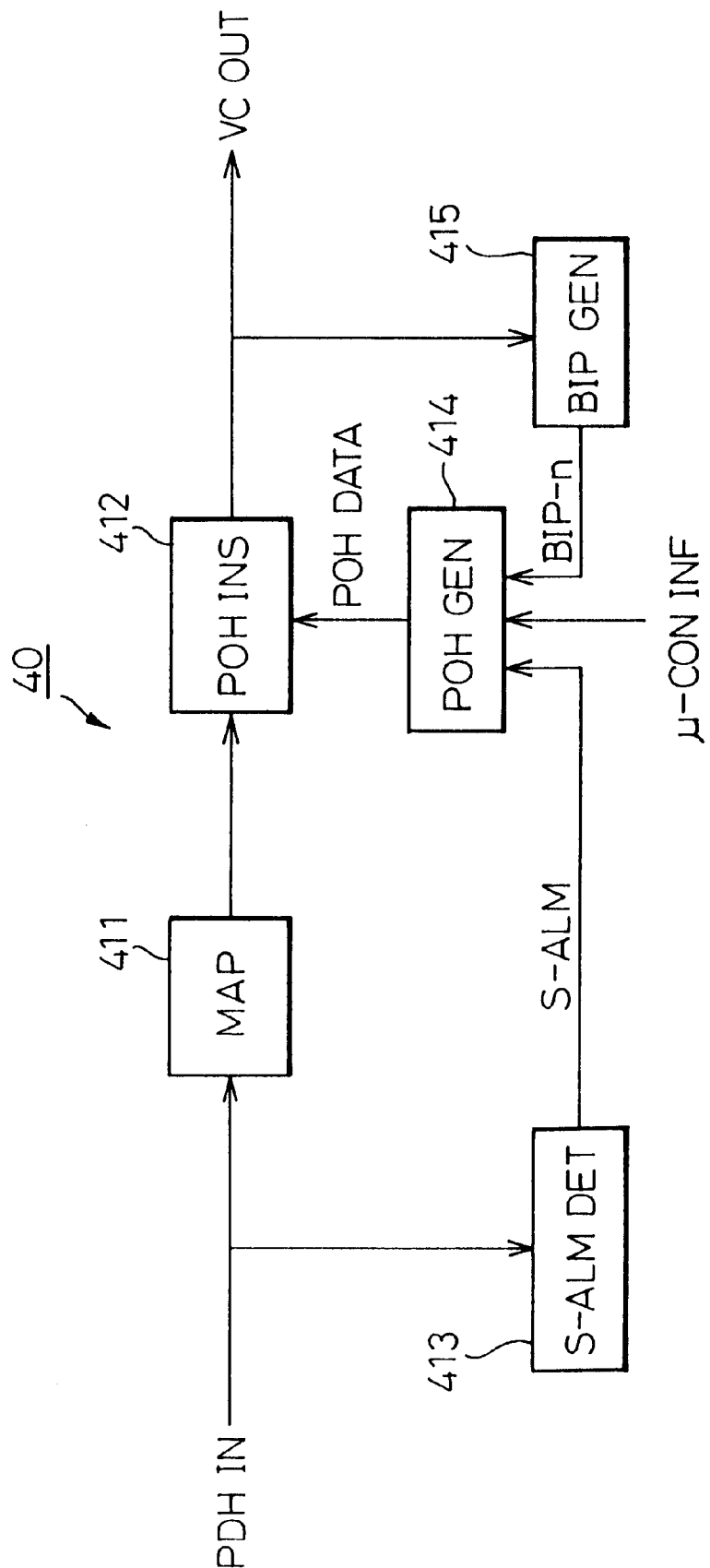
FIG. 6 is a drawing which shows the first embodiment of the transmitting-side function section of a path switch ring control apparatus according to the present invention.
Figure 8:
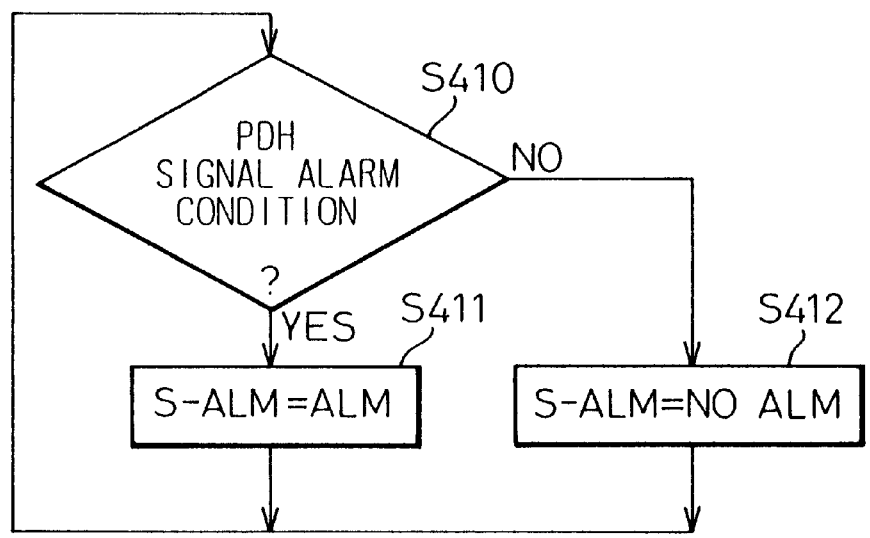
FIG. 8 is a basic processing flowchart of the transmitting-side function section of FIG. 6.

FIG. 6 is a drawing which shows the first embodiment of the transmitting-side function section (40 in FIG. 3) of a path switch ring control apparatus according to the present invention. FIG. 8 is a basic processing flow diagram of the transmitting-side function section of FIG. 6.

Figure 7:
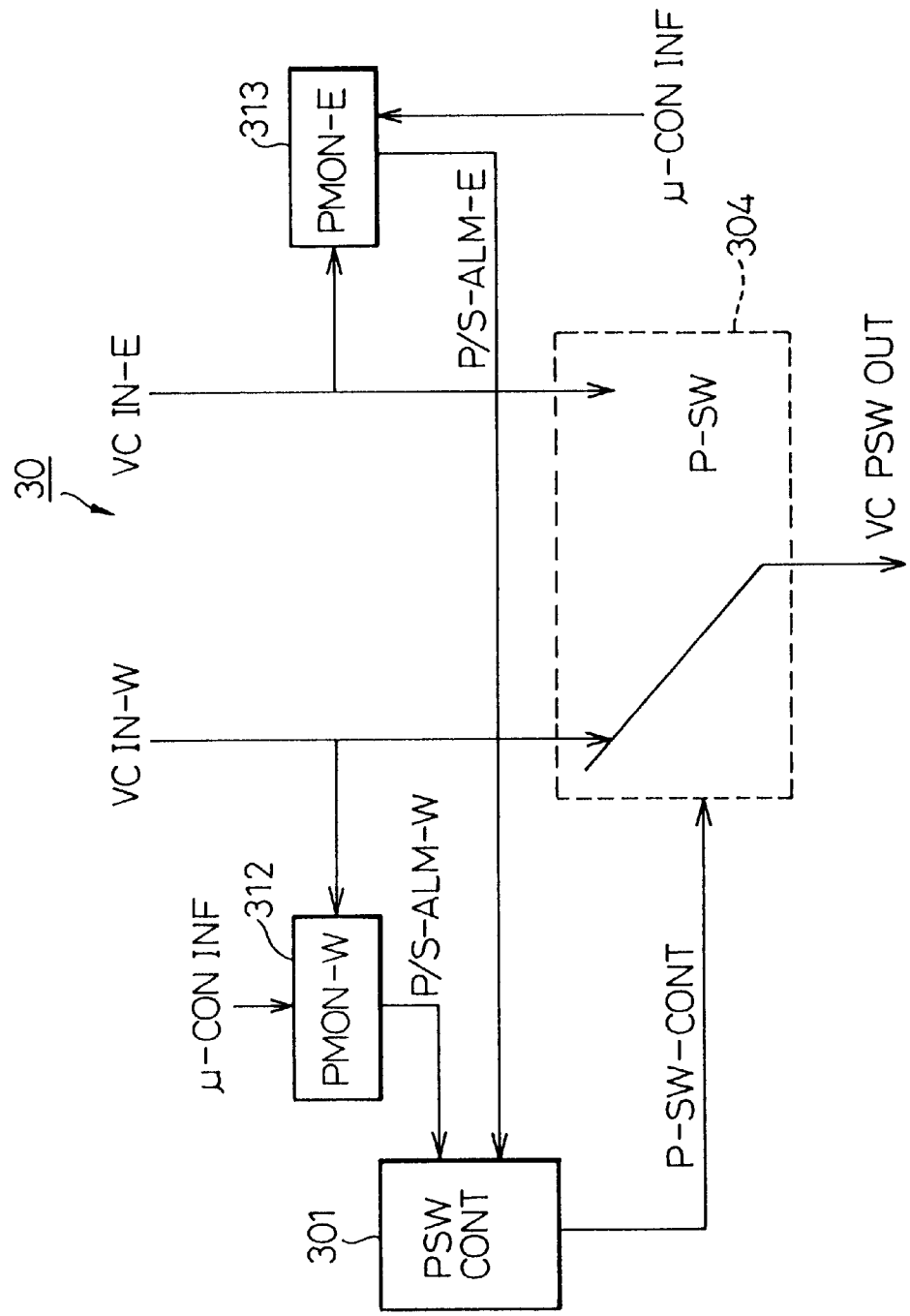
FIG. 7 is a drawing which shows the first embodiment of the path switching section of a path switch ring control apparatus according to the present invention.
Figure 9:
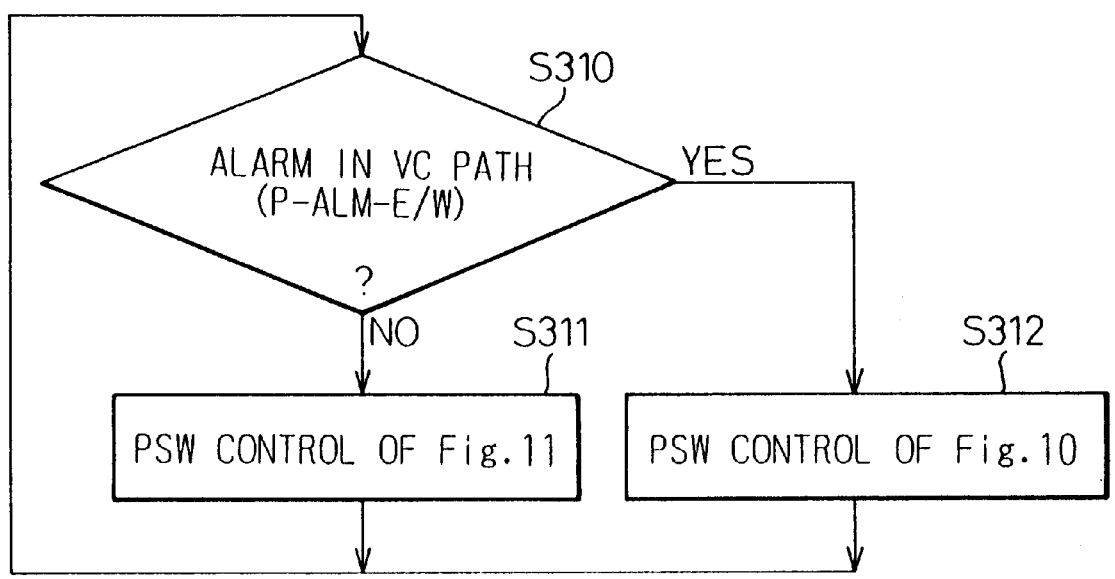
FIG. 9 is a basic processing flowchart of the path switching section of FIG. 7.

FIG. 7 shows the first embodiment of the path switching section (30 in FIG. 3) of a path switch ring control apparatus according to the present invention, and FIG. 9 is a basic processing flow diagram of the path switching section of FIG. 9. FIG. 10 is an example of P-ALM processing, and FIG. 11 is an example of S-ALM processing.

The transmitting-side function section shown in FIG. 6 corresponds to the network element (SDH NE#2) 62 in the example of FIG. 5. The transmission alarm detection section (S-ALM DET) 413 of FIG. 6 monitors the PDH signal (PDH IN) input from the PDH subnetwork of FIG. 5, and generates a transmission alarm signal (S-ALM) when it detects a degradation of quality of the PDH signal. The processing flow of FIG. 8 illustrates this. The above-noted transmission alarm signal includes alarm items such as loss of synchronization (LOF: loss of frame), an alarm signal (AIS: alarm indication signal), a signal error (SF: signal failure), and a signal degradation (SD).

The path overhead generation section (POH GEN) 414 adds the prescribed input information to the path overhead, this information including, in addition to the signal label (C2) and path trace (J1) which is obtained via the microcomputer interface (μ-CON INF) from the synchronous equipment management function (SEMF) as in the past, the transmission alarm signal (S-ALM) from the above-noted transmission alarm detection signal (S-ALM DET), and the BIP-n value (B3) which is generated at the BIP (bit interleaved parity) generation section 415, which generates parity information, from the output signal (VC OUT).

The mapping section (MAP) 411 maps the PDH input signal to an SDHVC frame. The path overhead insertion section (POHINS) 412 inserts the path overhead (POH) from the above-noted path overhead generation section (POH GEN) 414 into the VC path overhead byte (OHB) from the above-noted mapping section (MAP) 411, and outputs this as the SDH signal.

By doing this, when a fault occurs in the PDH signal, it is possible to transfer an alarm to the other equipment (to the network element (SHD NE#1) 61 in FIG. 5). The overhead byte (OHB) of the transferred transmission alarm signal (S-ALM) uses an undefined byte as set forth in ITU-TG. 70X. In a layer that has a large number of undefined overhead bytes, it is also possible to divide the transmission alarm signal (S-ALM) between the above-described LOF, AIS, SF, and SD for transfer. In addition, in a layer having a small number of undefined overhead bytes, it is also possible to perform the transfer of a total of two bits, comprising the one bit that is the logical OR of the LOF, AIS, and SF that have already experienced an interruption of service, and the one SD bit which indicates that, although service is not interrupted, there is a degradation of quality.

The path switching section of FIG. 7 corresponds to the network element (SDH NE#1) 61 in the example of FIG. 5. In FIG. 7, blocks having reference numerals of the form 30X, were described with regard to FIG. 4, and will therefore not be further described herein. In the same manner, in the drawings to follow, elements which were described previously will be assigned the same reference numeral and will be described as required.

The path monitors (PMON-W and PMON-E) 312 and 313 in FIG. 7 perform monitoring of the path overhead (POH) of the VC path signals (VCIN-W and VCIN-E) which are received via the respectively SDH interface sections, in the same manner as was described for the path monitor sections (PMON-W and PMON-E) shown in FIG. 4, and when doing so, in addition to the path alarm signals (P-ALM-W and P-ALM-E) of the past, have a function which detects (P/S-ALM-W and P/S-ALM-E) the transmission alarm signal (S-ALM) which is added as shown in FIG. 6.

In this embodiment, therefore, because the path switch section (P-SW) 304 makes selective output of one or the other of the two VC path signals (VCIN-W and VCIN-E) with respect to the transmission alarm signal (S-ALM) as well, it is possible to repair service at the side of the network element (SDH NE#1) 61, even if a fault occurs in the PDH in the example shown in FIG. 5. In FIG. 9, the path alarm signal (P-ALM) is first detected (step S310) and, if the alarm signal P-ALM is detected, the P-ALM processing is performed (step S312 and FIG. 10), but if the P-ALM signal is not detected, the S-ALM processing is performed (step S311 and FIG. 11). In FIG. 10, S-ALM processing (FIG. 11) is performed together with the P-ALM processing.

Figure 12:
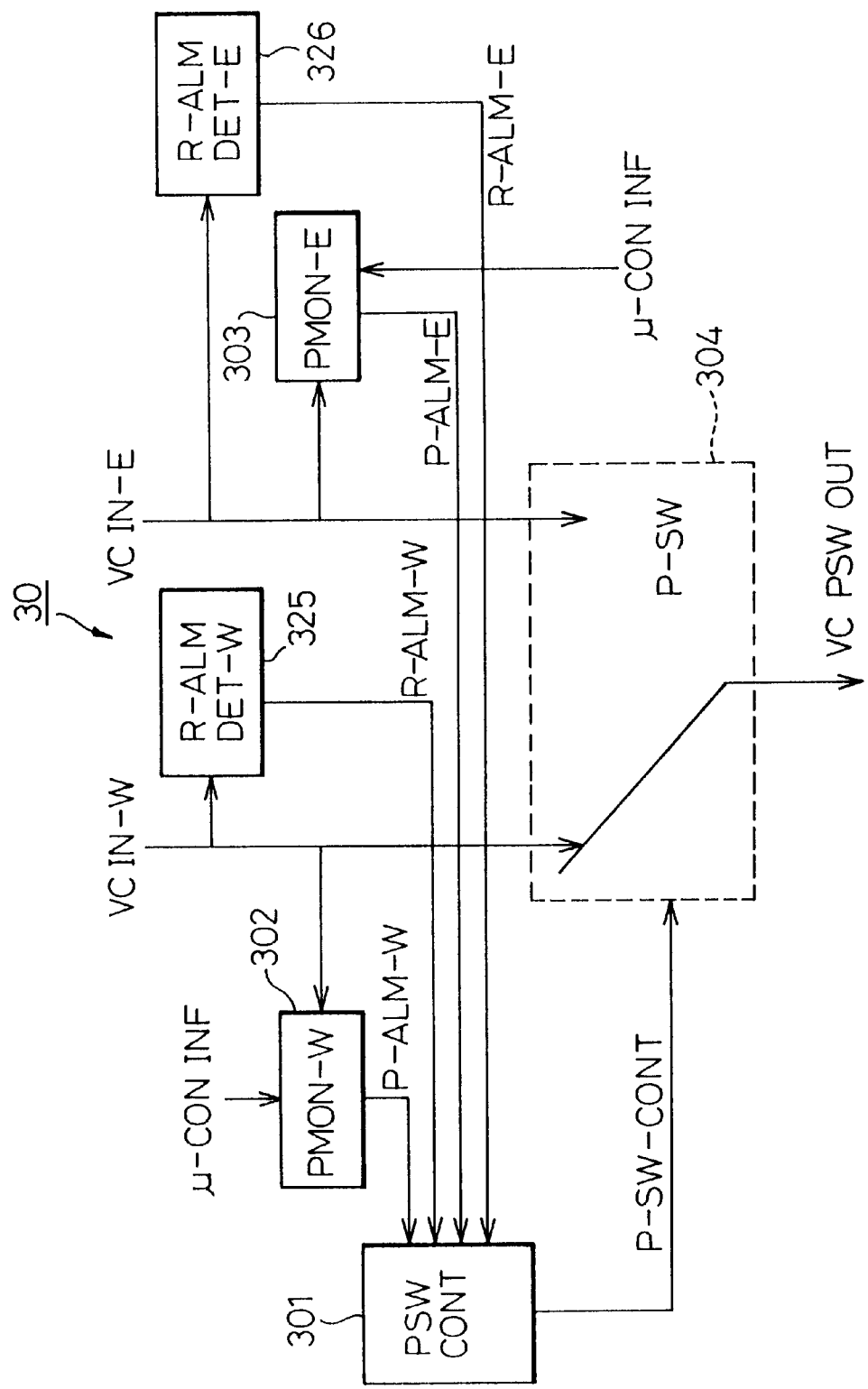
FIG. 12 is drawing which shows the second embodiment of the path switching section of a path switch ring control apparatus according to the present invention.
Figures 13, 14:
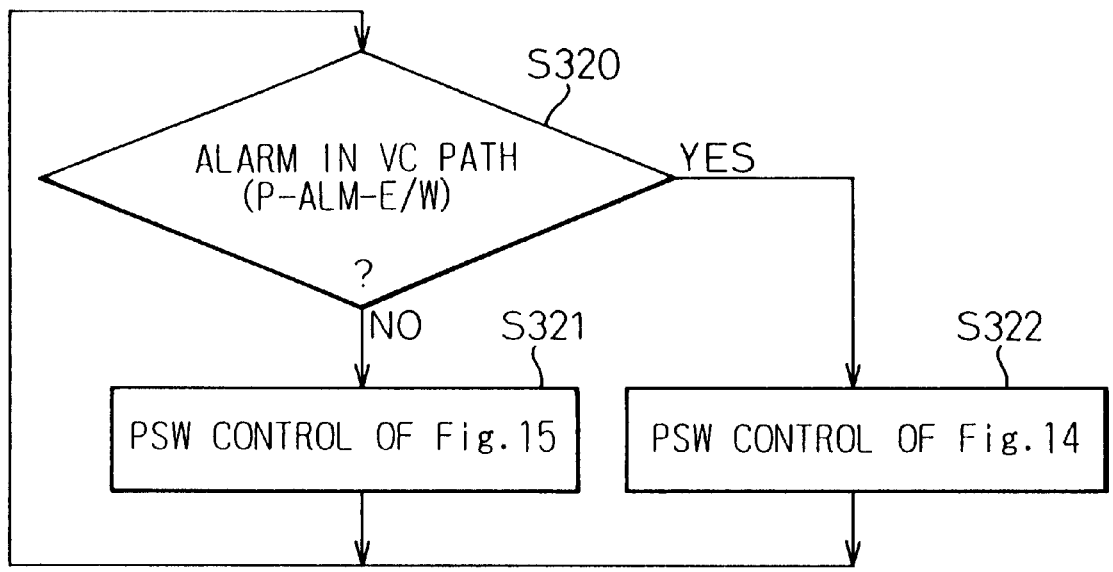
FIG. 13 is a basic processing flowchart of the path switching section of FIG. 12.
FIG. 14 is a drawing which shows an example of P-ALM processing.

FIG. 12 shows the second embodiment of the path switching section of a path switch ring control apparatus according to the present invention. FIG. 13 is a basic processing flow diagram of the path switching section shown in FIG. 12. FIG. 14 is an example of P-ALM processing, and FIG. 15 is an example of R-ALM processing.

In this embodiment, a function which corresponds to the transmission alarm detection section (S-ALM DET), which is added to the transmitting-side function section 40 in FIG. 6, is newly added to the receiving alarm detection sections (R-ALM DET-E and R-ALM DET-W) 325 and 326. At the above-noted receiving alarm detection sections 325 and 326, the received payloads within the VC paths are monitored and, if a quality degradation of the PDH signal is detected, the receiving alarm signal (R-ALM) is generated.

In this case, when LOF (loss of frame) of the SDH signal occurs at the transmitting side, because AIS is inserted into the payload data which is multiplexed in the virtual container, it is sufficient to monitor only LOF, AIS, SF, and SD. In this manner, because the path switch section (P-SW) 304 is directly switched by the receiving alarm signal (R-LM) in accordance with the receiving alarm detection sections (R-ALM DET-E and R-ALM DET-W) 325 and 326, in the case of FIG. 5, for example, it is possible to repair service by control of only the network element (SDH NE#1) 61. Therefore, the addition of a transmitting-side function such as shown in FIG. 6 is not necessary.

As shown in FIG. 13, the receiving alarm detection sections (R-ALM DET-E and R-ALM DET-W) 325 and 326 first perform detection of the path alarm signal (P-ALM) (step S320). In the case in which the P-ALM signal is detected, P-ALM processing (step S322 and FIG. 14) is performed. If, however, the P-ALM signal is not detected, processing of the receiving alarm signal (R-ALM) is performed (step S321 and FIG. 15). In FIG. 14, R-ALM processing (FIG. 15) is performed together with the P-ALM processing.

FIGS. 16 through 23 show the an embodiment of a path switch ring control apparatus according to the present invention for the purpose of solving the second above-described problem.

Figure 16:
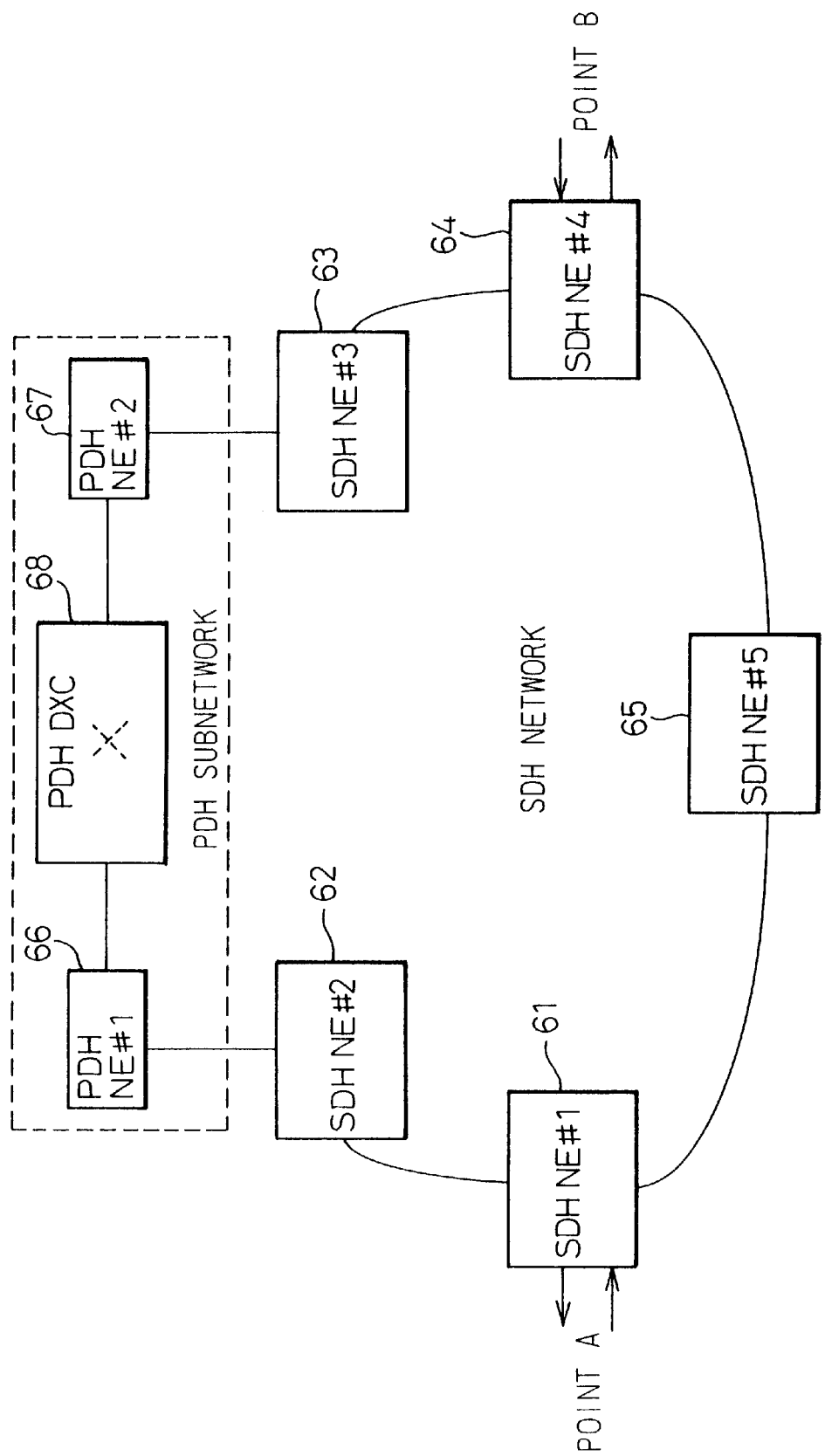
FIG. 16 is a drawing which shows an example of an SDH network which includes a PDH subnetwork accompanying a cross-connect apparatus.

In FIG. 16 shows the SDH network which includes a PDH subnetwork as shown in FIG. 5, but in this case the above-noted PDH subnetwork further includes a cross-connect apparatus (PDH DXC) 68. Although the first embodiment and the second embodiment heretofore described solve the first problem, in a case such as this, in which a cross-connect apparatus 68 exists in the PDH subnetwork, if a setting error occurs in this cross-connect apparatus 68, communication data misconnection or loss occurs between the terminating network elements (SDH NE#2 and SDH NE#3) 62 and 63 on the SDH network side. As a result, an erroneous signal is supplied to the network elements (SDH NE#1 and SDH NE#4) 61 and 64, which have the service access points A and B, and it is not even possible to detect the fact that there is a fault.

Figure 17:
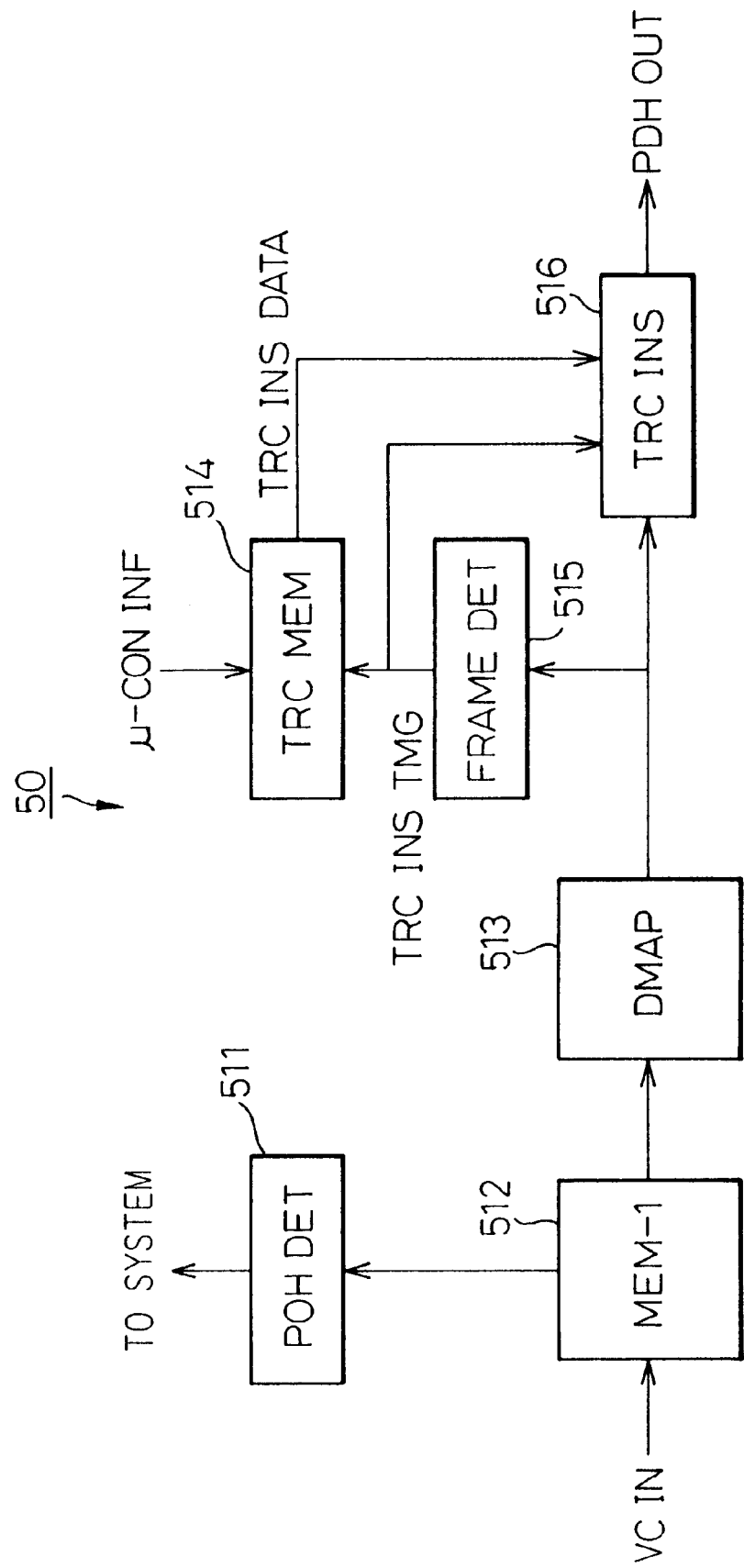
FIG. 17 is a drawing which shows the first embodiment of the receiving-side function section of a path switch ring control apparatus according to the present invention.
Figure 18:
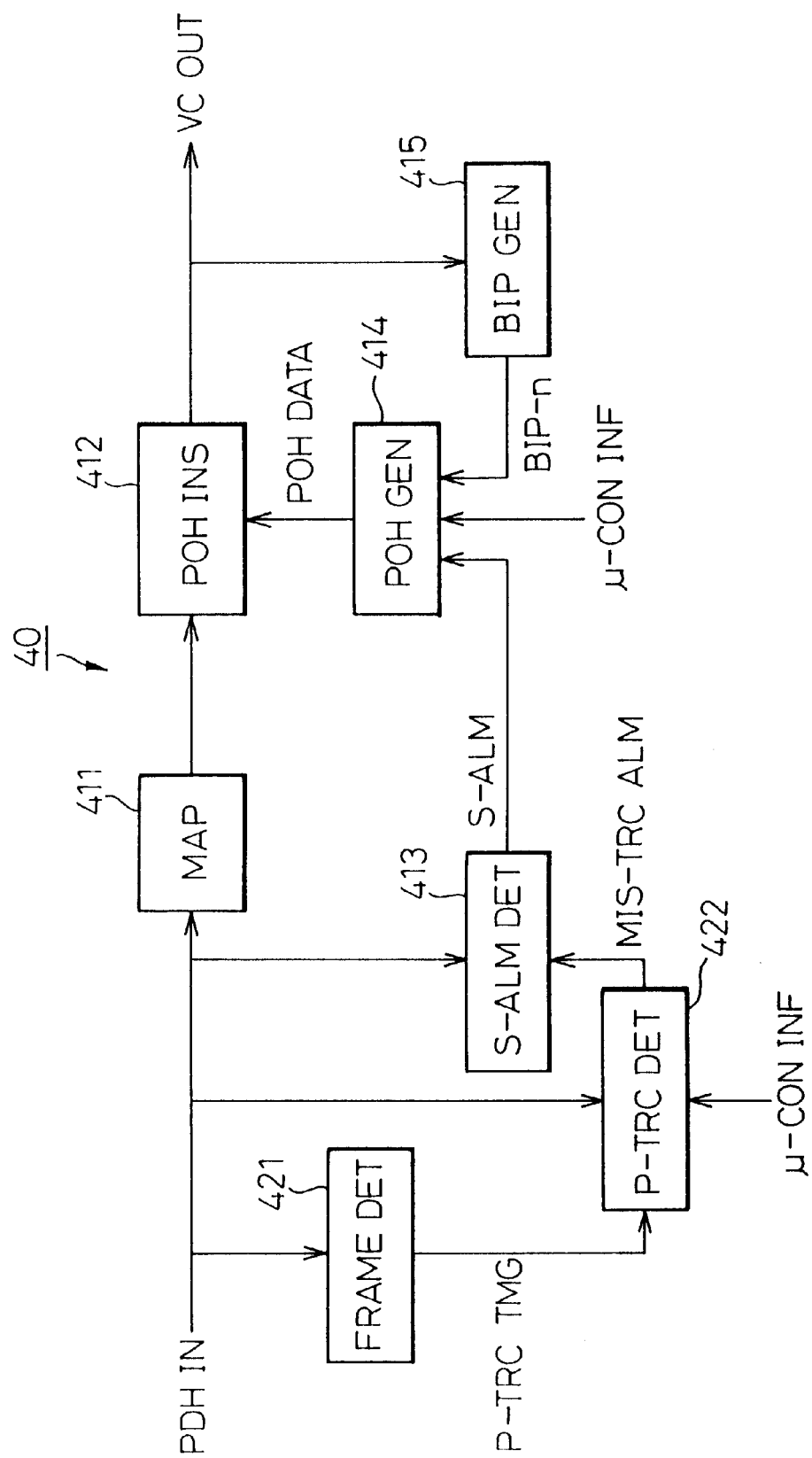
FIG. 18 is a drawing which shows the second embodiment of the transmitting-side function section of a path switch ring control apparatus according to the present invention.
Figure 19:
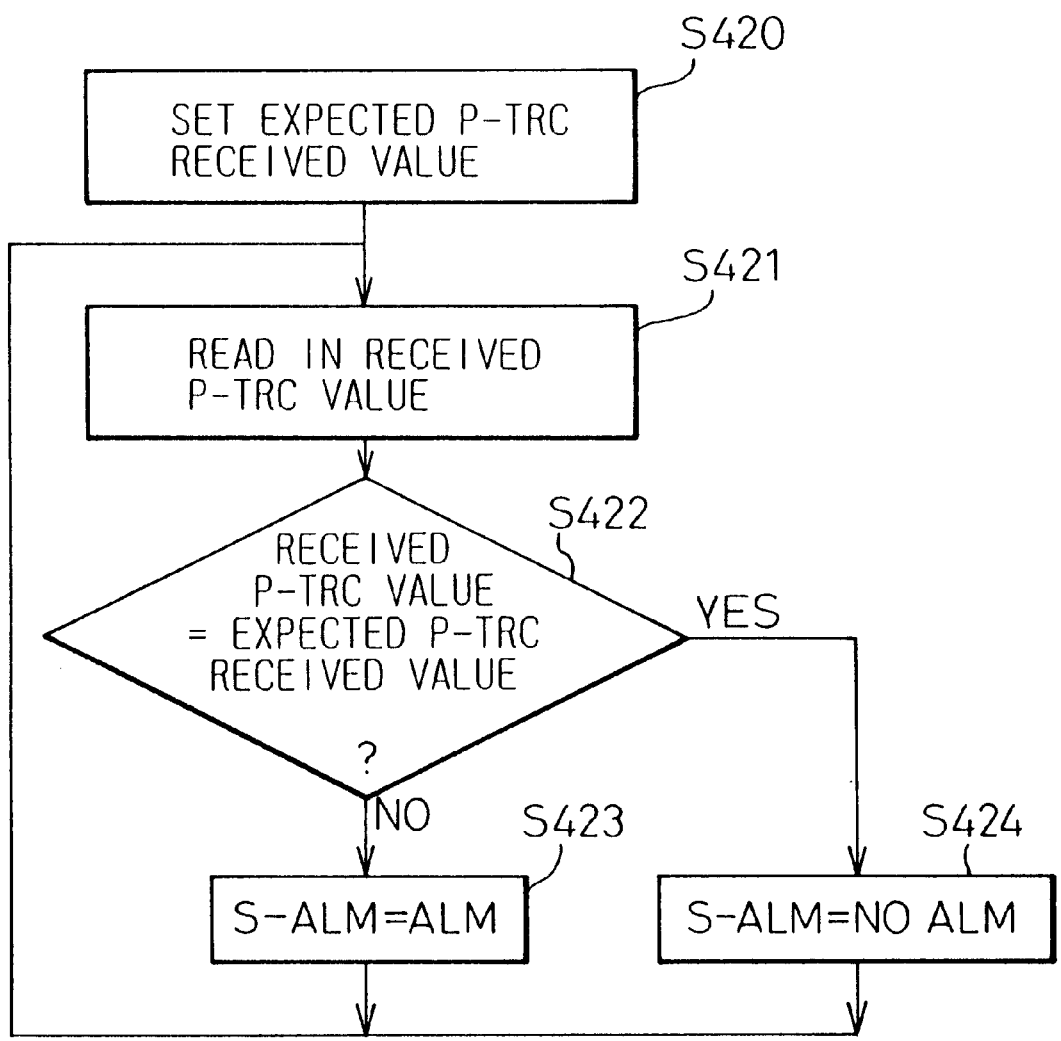
FIG. 19 is a drawing which shows an example of the basic processing flow of the transmitting-side function section of FIG. 18.

FIG. 17 shows the first embodiment of the receiving-side function section 50 (FIG. 3) of a path switch ring control apparatus according to the present invention. FIG. 18 shows the second embodiment of the transmitting-side function section 40 (FIG. 3) according to the present invention, which corresponds to FIG. 17. FIG. 19 shows an example of the basic processing flow of the transmitting-side function section of FIG. 18.

The receiving-side function section of FIG. 17 corresponds to the receiving-side function section 50 of the network element (SDH NE#3) 63, taking the example of FIG. 16.

In FIG. 17, the memory section (MEM-1) 512 performs temporary buffering of the VC input signal (VCIN), the part of the start of the path overhead (POH) which is indicated by the AU pointer shown in FIG. 2 being extracted. The path overhead detection section (POH DET) 511 separates from the thus-extracted POH data, for example, the J1, C2, and B3 bytes. The demapping section (DMAP) 513 extracts the PDH signal to be sent to the PDH subnetwork from the VC signal within the above-noted memory section 512, by means of demapping processing.

The frame detection section (FRAME DET) 515 detects the above-noted PDH signal frame and detects the position of a spare bit (undefined bit) in the PDH frame for the insertion of path trace data, and generates the timing of the insertion thereof (TRC INS TMG). The path trace information (J1), which is extracted by the above-noted path overhead detection section 511, is set into the trace memory section (TRC MEM) 514 via the microcomputer interface ($\mu$-CON INF) as the trace insertion data (TRC INS DATA), this data being output one bit at a time in accordance with the insertion timing (TRC INS TMG) from the above-noted frame detection section 515. The trace insertion section (TRC INS) 516 inserts the trace insertion data from the trace memory section 514 at successive bit positions in response to the above-noted insertion timing.

The transmitting-side function section of FIG. 18 corresponds to the network element (SDH NE#2) 62, taking the example of FIG. 16.

The only difference between FIG. 18 and the first embodiment of the transmitting-side function section shown in FIG. 6 is the frame detection section (FRAME DET) 421 and the path trace detection section (P-TRC DET) 422, which are described below.

The frame detection section (FRAME DET) 421 detects the positions of spare bits of a received PDH frame, and generates the timing (P-TRC TMG) for the reading in of the trace data thereof.

The path trace detection section (P-TRC DET) 422 reads in the trace data in accordance with the above-noted read-in timing, and performs a comparison with respect to expected received value of trace data set via the microcomputer interface ($\mu$-CON INF). In the case in which the comparison results are non-coincident, a non-coincidence alarm signal (MIS-TRC ALM) is output. FIG. 19 shows the basic processing flow involved in these operations. First, the above-noted expected received value of path trace data is set (step S420), and a comparison (step S422) is made between this expected value and the actually received path trace value (step 421). If the results are non-coincident, a transmitting alarm signal is output (step S423).

In this manner, at the transmission alarm detection section (S-ALM DET) 41 of this embodiment, the above-noted non-coincidence alarm signal (MIS-TRC ALM) is added as a new transmission alarm signal (S-ALM) factor. Therefore, according to this embodiment, even the PDH subnetwork includes a cross-connect apparatus (PDH DXC) 68 and a erroneous setting thereof, for example, results in the occurrence of an erroneous circuit connection, and the transmission alarm signal (S-ALM) caused by the above-noted non-coinciding trace information will be sent to a service access point (point A of SDH NE#1 in this example) within the SDH network. As a result, the above-noted network element switches its path switch 304 so as to select the path route that does not include the above-noted PDH subnetwork.

Figure 20:
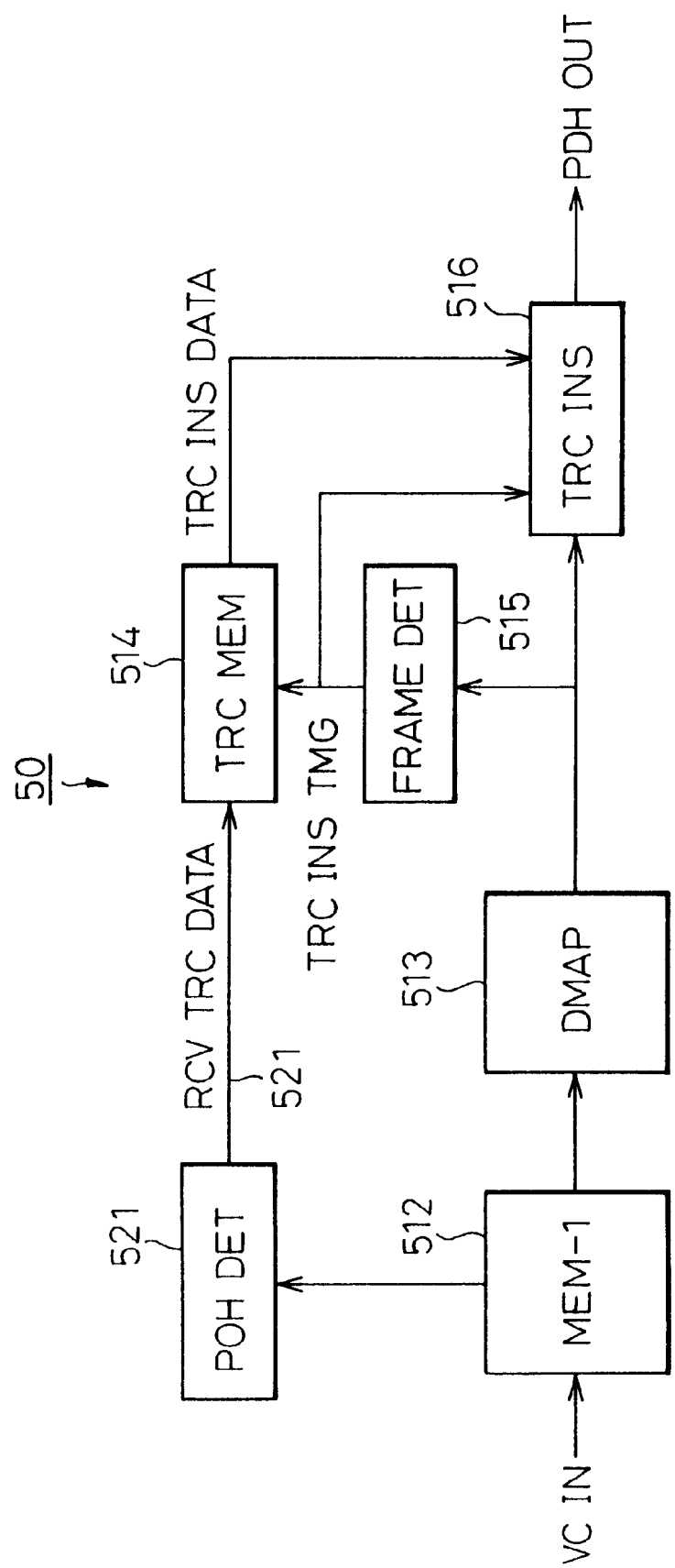
FIG. 20 is a drawing which shows the second embodiment of the receiving-side function section of a path switch ring control apparatus according to the present invention.
Figure 21:
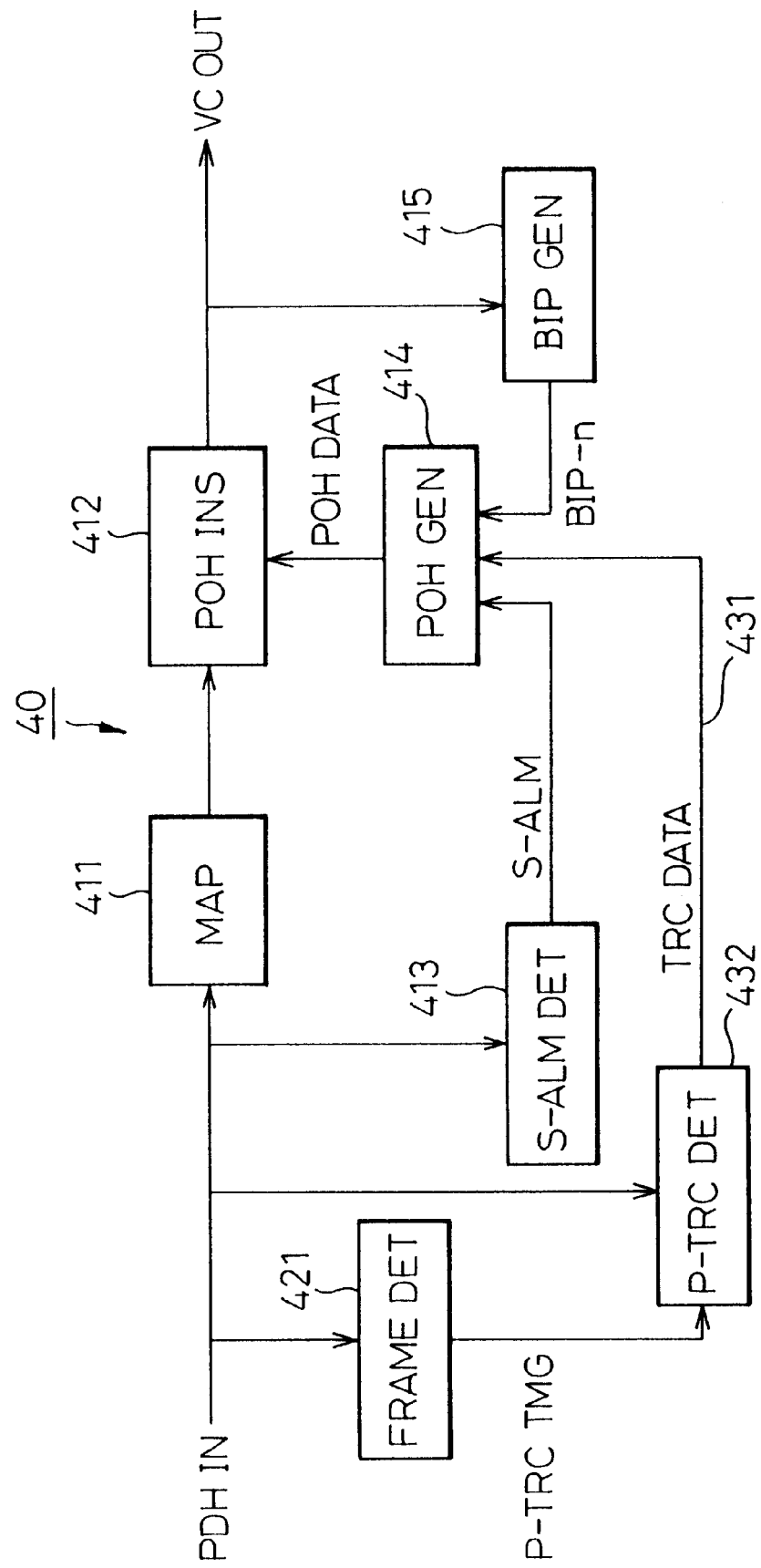
FIG. 21 is a drawing which shows the third embodiment of the transmitting-side function section of a path switch ring control apparatus according to the present invention.
Figure 22:
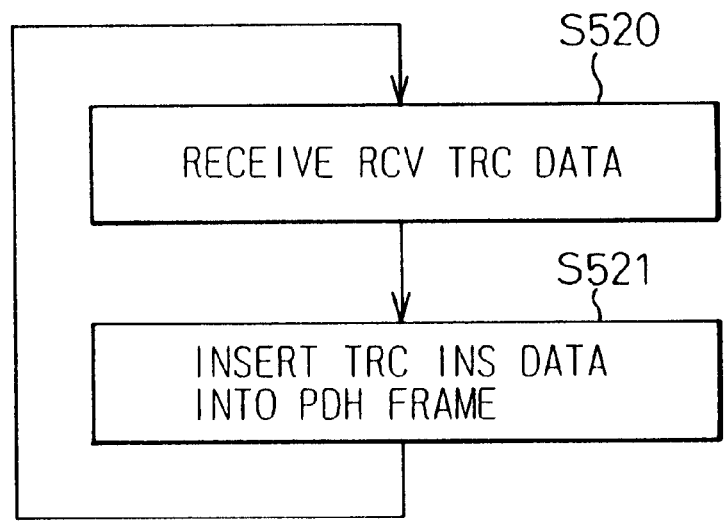
FIG. 22 is a drawing which shows an example of the basic processing flow of the receiving-side function section of FIG. 20.
Figure 23:
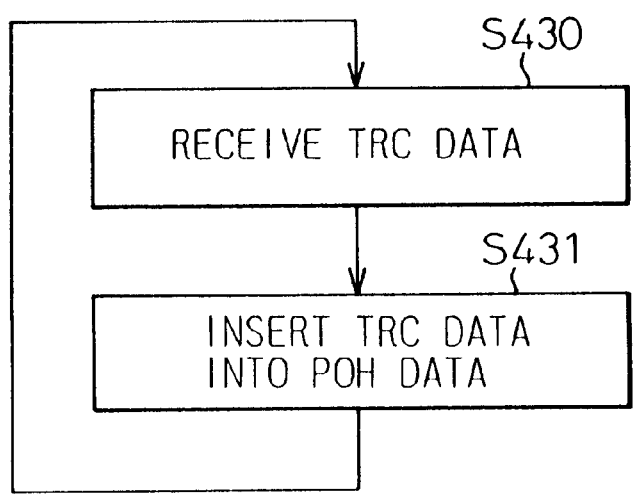
FIG. 23 is a drawing which shows an example of the basic processing flow of the transmitting-side function section of FIG. 21.

FIG. 20 shows the second embodiment of the receiving-side function section 50 (FIG. 3) of a path switch ring control apparatus according to the present invention, and FIG. 21 shows the third embodiment of the transmitting-side function section 40 (FIG. 3) of a path switch ring control apparatus according to the present invention. Both FIG. 20 and FIG. 21 show different embodiment aspects of those shown in FIG. 17 and FIG. 18. FIG. 22 and FIG. 23 show examples of the basic processing flow of the receiving-side function section of FIG. 20 and the transmitting-side function section of FIG. 21, respectively.

In the receiving-side function section shown in FIG. 20, the associated path overhead detection section (POH DET) 521 differs from the path overhead detection section 511 shown in FIG. 17 in that the separated trace information (the path trace byte J1) is directly sent to the trace memory section (TRC MEM) 514, as the received trace data (RCV TRC DATA) 521, within the receiving-side function section, without passing through the system. Other aspects of this receiving-side function section are the same as that shown in FIG. 17. As shown in FIG. 22, when the trace data (J1) is received (step S520), the associated received trace data (RCV TRC DATA) 521 is applied to the trace memory section 514 and, via the trace insertion section (TRC INS) 516, is inserted into spare bits of the PDH data (step S521).

In the transmitting-side function section shown in FIG. 21, the associated path trace detection section (P-TRC DET) 432 differs from the path trace detection section (P-TRC DET) shown in FIG. 18 in that the trace data is read in accordance with the above-noted read-in timing and sent as trace data 413 to the path overhead generation section (POH GEN) 414 as is, without performing a comparison between this data and the expected received value. As shown in FIG. 23, the received trace data (step S430) is inserted into the path overhead (POH) and transmitted (step S431).

In this manner, in this embodiment the non-coincidence trace alarm (MIS-TRC ALM) detection function of the path trace detection section 432 becomes unnecessary. This function is executed by performing, at the path monitor sections (PMON-E and PMON-W) at the service access point within the SDH network (in this example point A at SDH NE#1), a comparison between the above-noted received trace data (TRC DATA) and the expected received value which is set via the microcomputer interface ($\mu$-CON INF), the result being used to switch the path switch section 304. By doing this, this embodiment also is capable, similar to the above-described embodiment, of switching the path switch even if a erroneous connection occurs within a PDH subnetwork.

Figure 24:
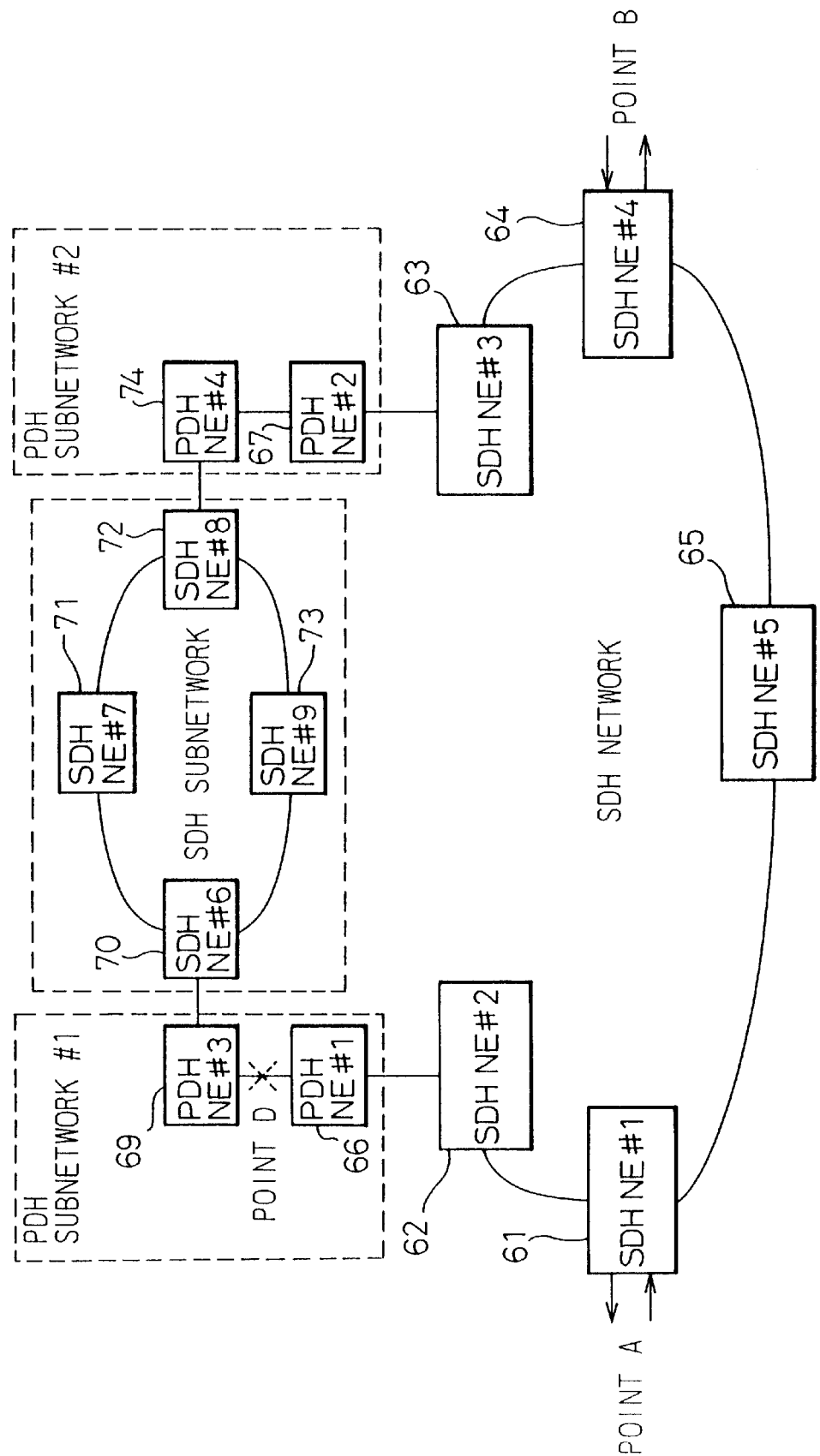
FIG. 24 is a drawing which shows an example of the configuration of an SDH network to which is connected an SDH subnetwork within a PDH subnetwork.

FIGS. 24 though 37 show embodiments of a path switch ring control apparatus according to the present invention for the purpose of solving the earlier-described third and fourth problems.

FIG. 24 shows an example of the configuration in which there is an additional SDH subnetwork within a PDH subnetwork. This configuration is related to the earlier-described third and fourth problems, which remain even if the first and second problems are solved by the present invention as described above.

With regard to the third problem, if the case in which a fault occurs at point D of the PDH subnetwork #1 is considered, it is not possible for the network element (SDH NE#8) 72 to be serviced by the received signals from either of the network elements (SDH NE#7 and SDH NE#9) 71 and 73. In this case, although the path at terminating network element 72 should be maintained in its current condition, in reality because of the delay time difference between the two path routings, not only does unnecessary path switching occur, but event notification is made to the SEMF (synchronous equipment management function) section.

With regard to the fourth problem, in this example the path signal is sent from the SDH network to the PDH subnetwork, further transferred from the PDH subnetwork to the SDH subnetwork, and then by the reverse routing is returned to the original SDH network, this representing a number of passages between SDH and PDH networks. For this reason, mapping and demapping jitter occurs in the PDH/SDH multiplexing and demultiplexing executed therebetween, this jitter accumulating to cause a degradation of the circuit quality.

Figure 25:
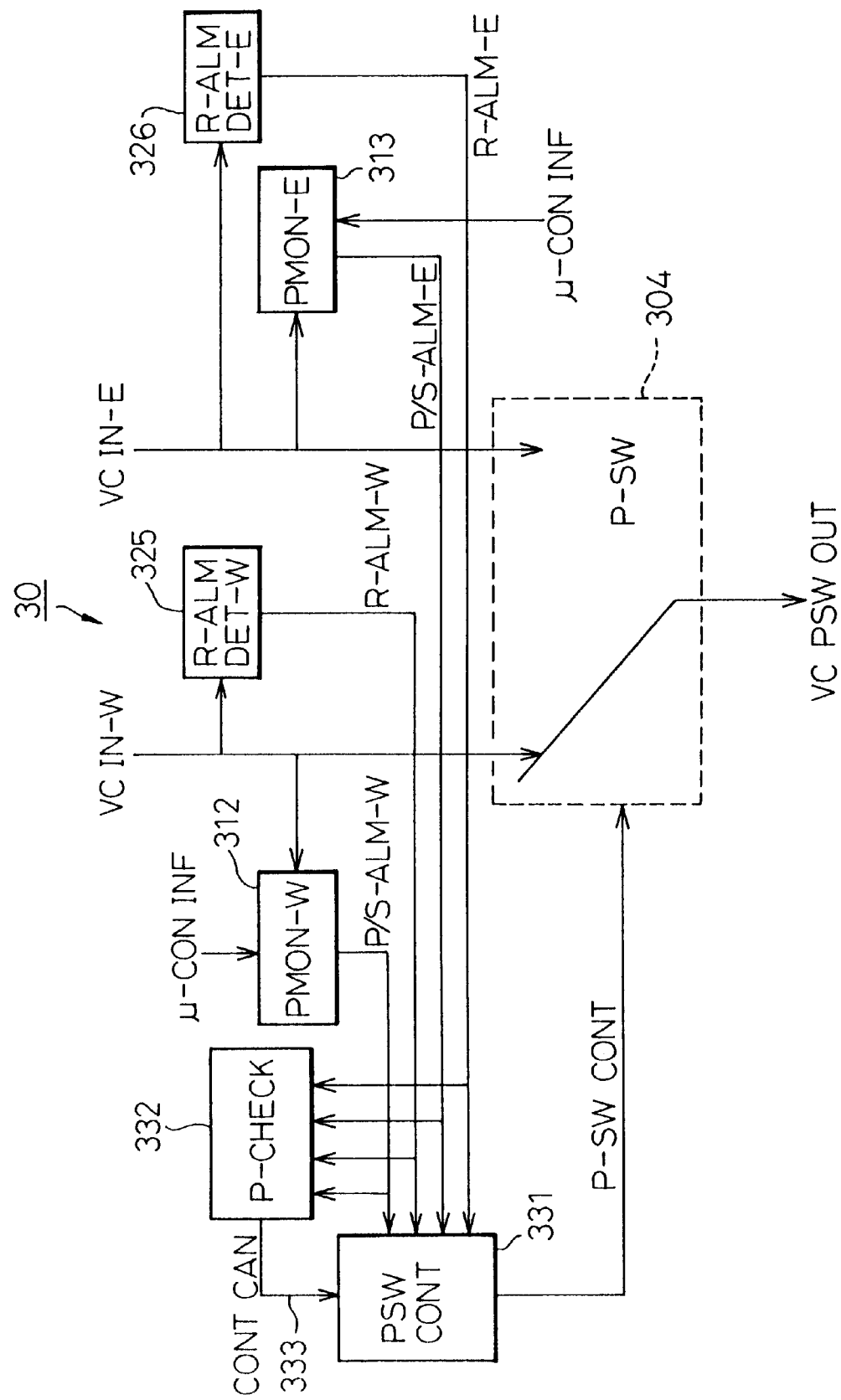
FIG. 25 is a drawing which shows the third embodiment of the path switching section of a path switch ring control apparatus according to the present invention.
Figure 26:
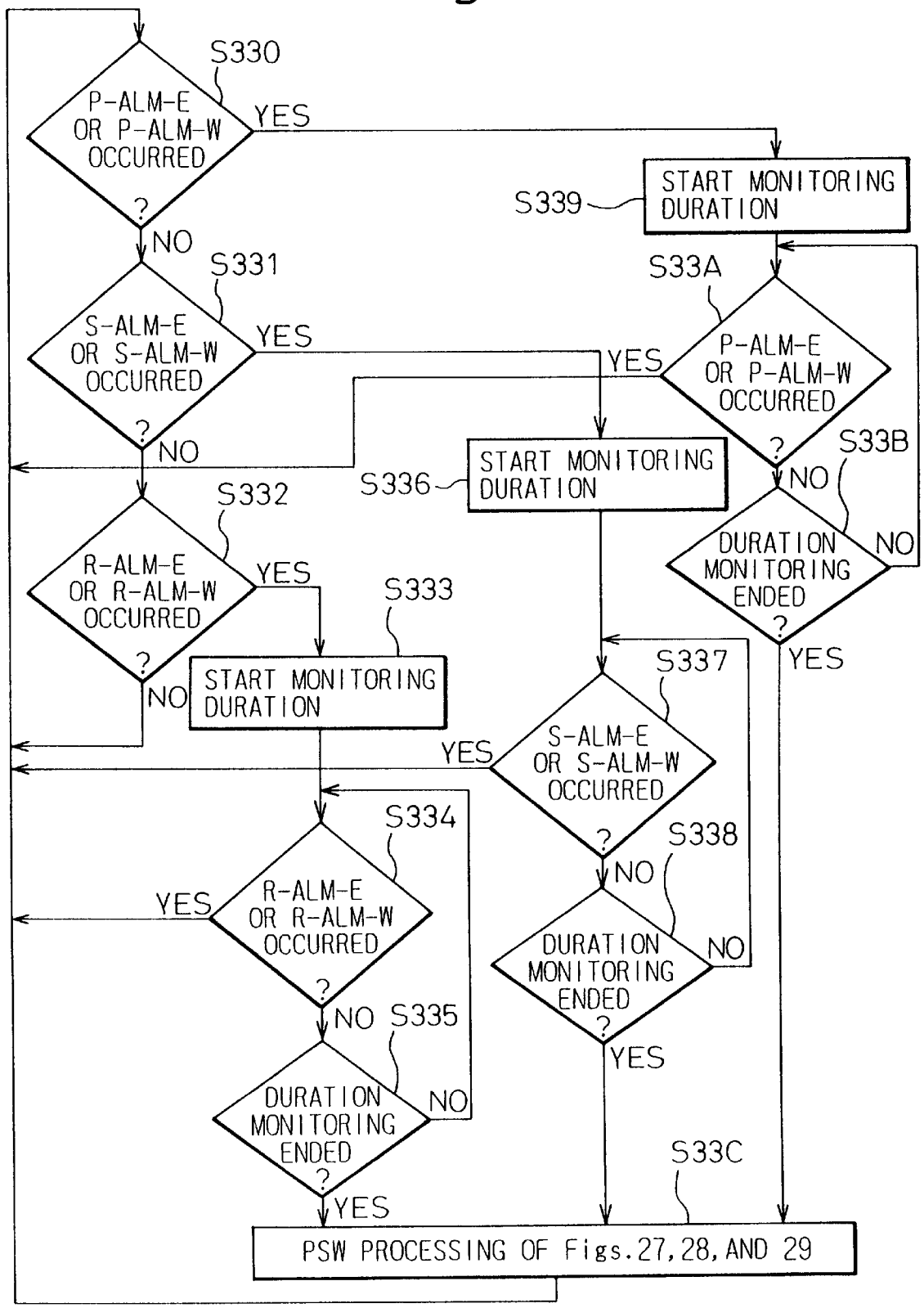
FIG. 26 is a drawing which shows an example of the basic processing flow of the path switching section of FIG. 25.

FIG. 25 shows the third embodiment of the path switching section 30 (FIG. 3) of a path switch ring control apparatus according to the present invention, and FIG. 26 shows an example of the basic processing flow of the path switching section shown in FIG. 25. FIGS. 27 through 29 show examples of P-ALM, S-ALM, and R-ALM processing in FIG. 26.

The path switching section 30 which is shown in FIG. 25 includes the earlier-described first and second embodiments (FIG. 7 and FIG. 12), with the addition of a path check section (P-CHECK) 332, and a partial change in the function of the path switch control section (PSW CONT) 331.

The above-noted path switch section 332 monitors the continuation of the earlier-described alarm signals (P-ALM, S-ALM, and R-ALM). This is done to prevent a switching operation of the path switch section 304 immediately after the alarm signal detection, and to achieve this purpose a control cancel signal (CONT CAN) 333 is applied to the path switch control section (PSW CONT) 333 during a prescribed monitoring time period during which a path alarm does not occur for the other path. The path switching of the above-noted path switch control section 331 is disable during the time period in which control cancel signal (CONT CAN) 333 is applied thereto, the switching condition being held unchanged. By doing this, unnecessary path switching caused by, for example, a difference in the delay times between SDH subnetworks, is suppressed.

FIG. 26 shows an example of the control processing of the above-noted path switch, in which the occurrence of each alarm signal is detected (steps S330 to S332). Then, each time an alarm is detected, the continuation thereof is monitored (steps S333, S336, and S339), with flow returning to the beginning if the alarm is reset during the prescribed monitoring period (steps S334, S337, and S33A), and path switch switching processing (S33C) being performed after the elapse (steps S335, S338, and S33B) of that period of time.

Figure 30:
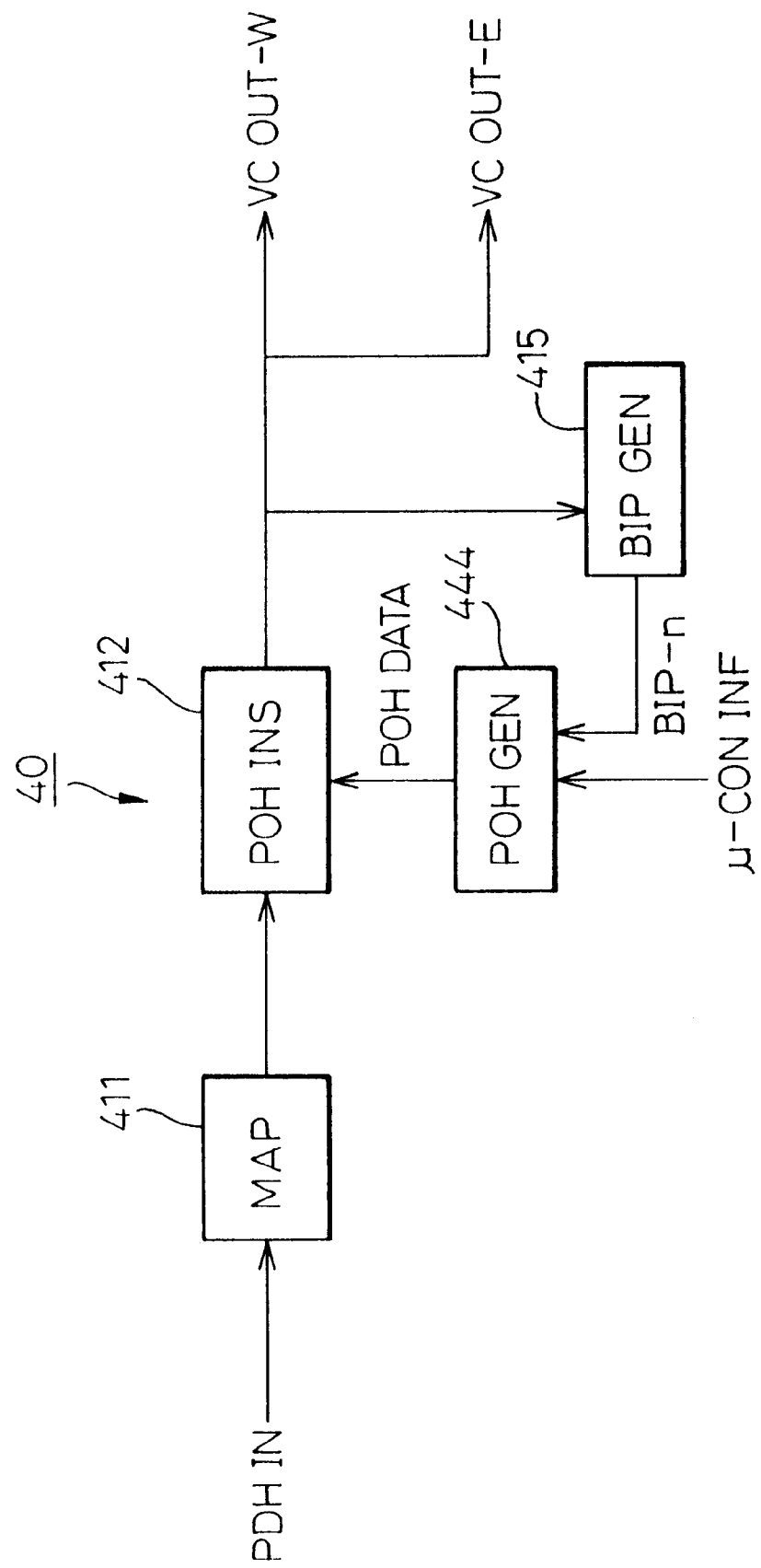
FIG. 30 is a drawing which shows the fourth embodiment of the transmitting-side function section of a path switch ring control apparatus according to the present invention.
Figure 31:
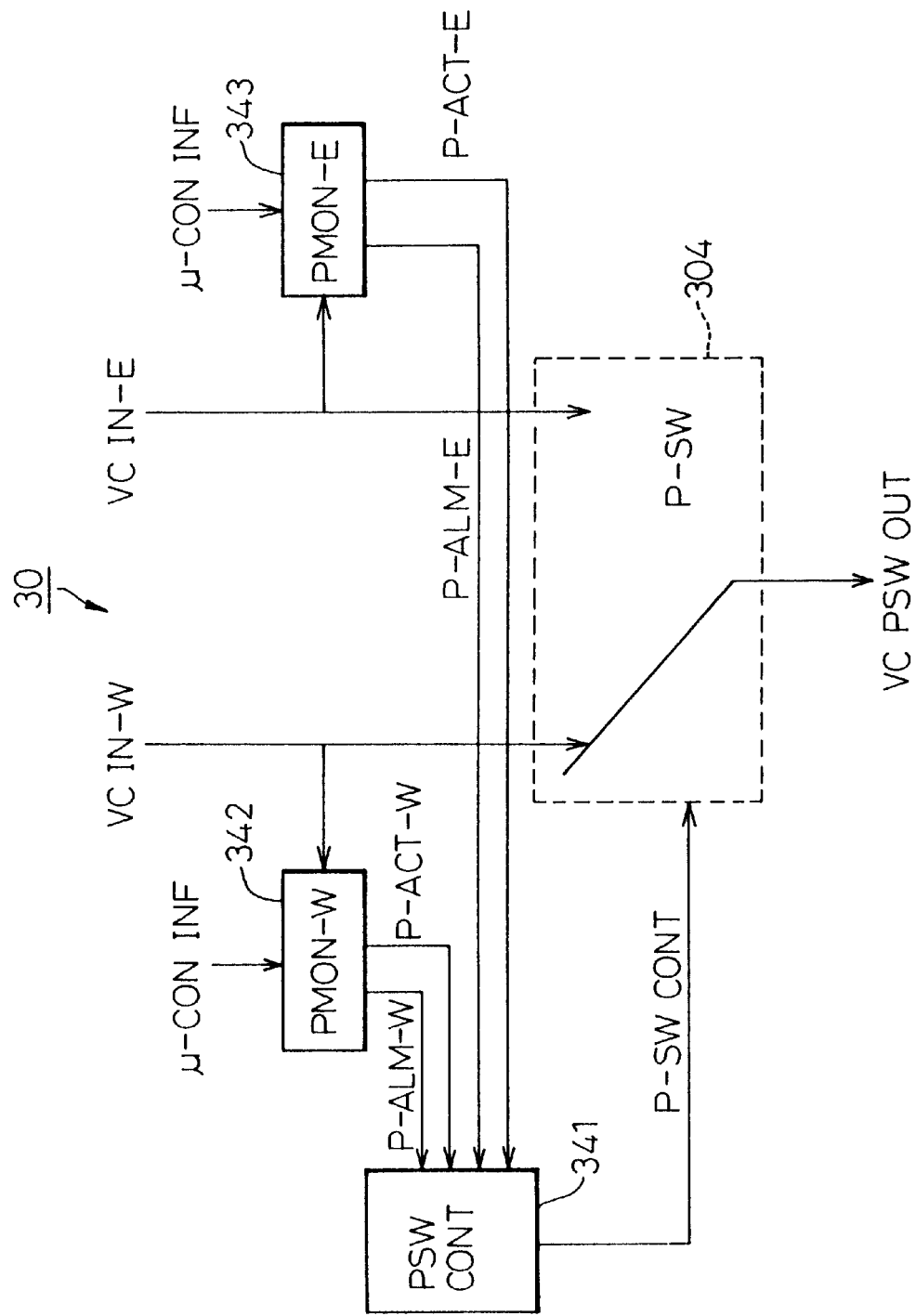
FIG. 31 is a drawing which shows the fourth embodiment of the path switching section of a path switch ring control apparatus according to the present invention.
Figure 32:
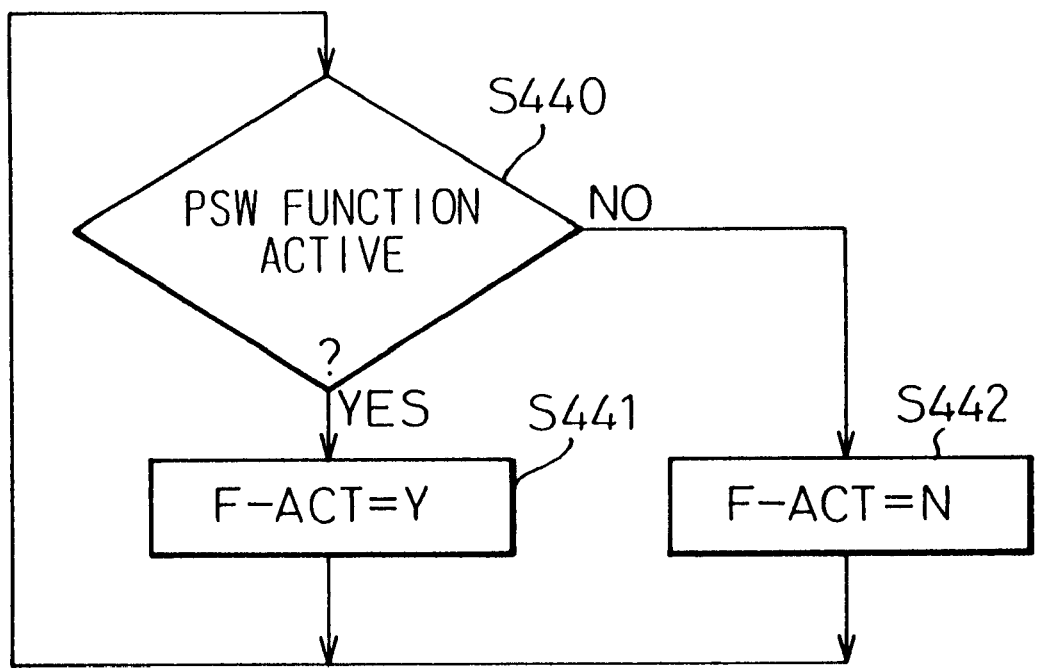
FIG. 32 is a drawing which shows an example of the basic processing flow of the transmitting-side function section of FIG. 30.
Figure 33:
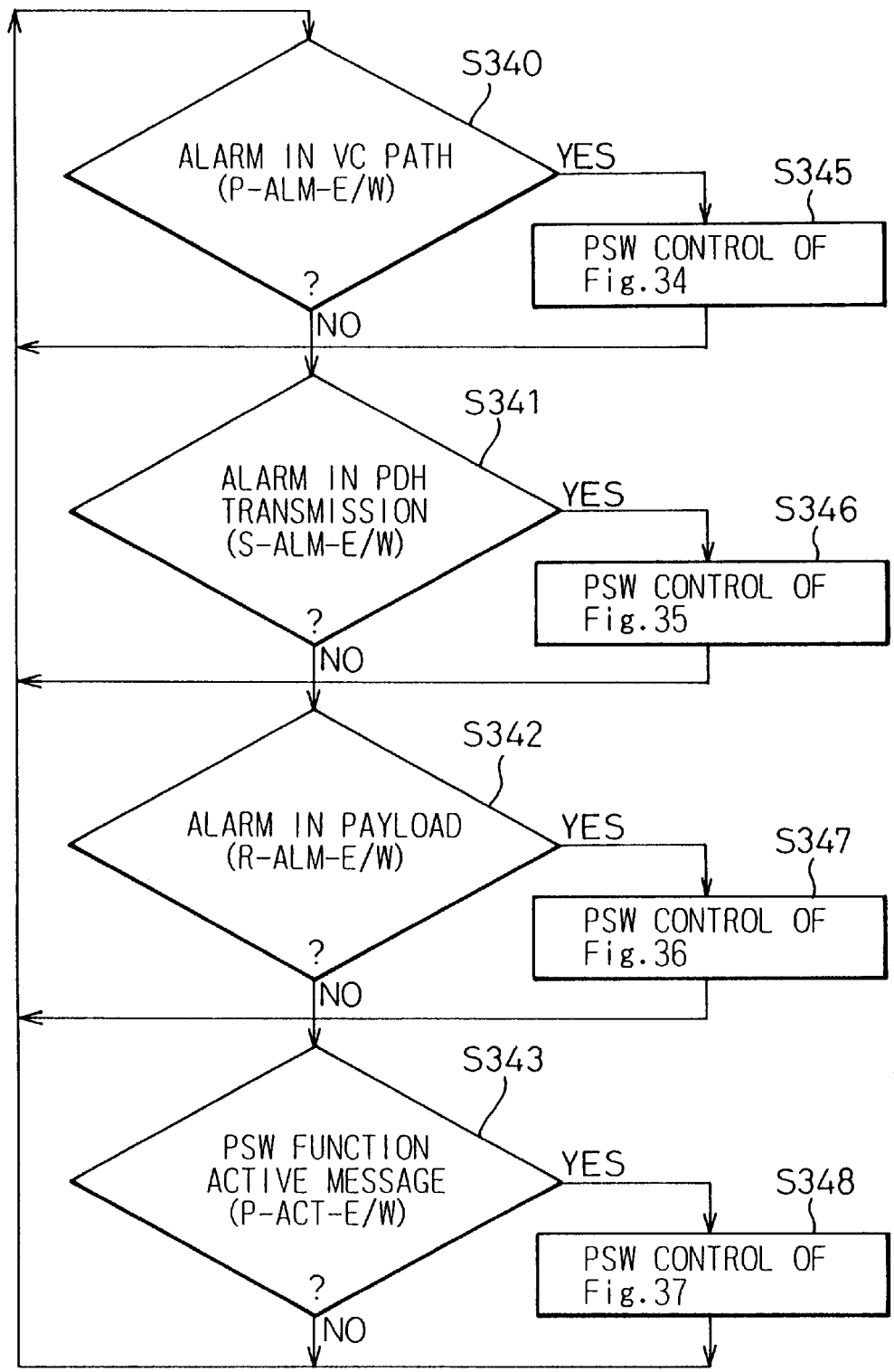
FIG. 33 is a drawing which shows an example of the basic processing of the path switching section of FIG. 31.

FIG. 30 shows the fourth embodiment of the transmitting-side function section 40 (FIG. 3) of a path switch ring control apparatus according to the present invention, and FIG. 31 shows the fourth embodiment of the path switching section 30 (FIG. 3) of a path switch ring control apparatus according to the present invention. FIG. 32 shows an example of the basic processing flow of the transmitting-side function section which is shown in FIG. 30, and FIG. 33 shows and example of the basic processing flow of the path switching section which is shown in FIG. 31. FIGS. 34 through 37 show examples of P-ALM, S-ALM, R-ALM, and P-ACT processing.

The transmitting-side function section which is shown in FIG. 30 corresponds to the transmitting-side function section 40 of the network element (SDH NE#1) 61 at the service access point A in the example shown in FIG. 24. In FIG. 30, a path switching function active message (P-ACT) for the purpose of making a judgment as to whether or not to pass through the PSH subnetwork via the microcomputer interface ($\mu$-CON INF) is set in the path overhead generation section (POH GEN). As shown in FIG. 32, when this function is utilized the setting P-ACT=Y is made (step S441), and when it is not used the setting P-ACT=N is made (step S442). The above-noted message is inserted into the path overhead (POH) by the path overhead insertion section (POH INS) 412, and is output in both path directions on the SDH ring network (VCOUT-E and VCOUT-W).

In terms of the above-presented description of FIG. 30, the path switching section 30 which is shown in FIG. 31 corresponds to the path switching section 30 of the network element (SDH NE#4) 64 at the service access point B. The path monitor sections (PMON-E and PMON-W) 342 and 343 shown in FIG. 31 further monitor the path switching function active message (P-ACT) which is added to the path overhead in FIG. 30. When the above-noted message is detected from each of the input signals (VCIN-E and VCIN-W), the corresponding P-ACT signal is output to the path switch control section (PSW CONT) 341. Only when this path switch control section 341 detects the P-ACT signal for either one of the paths does it select that path automatically. As shown in FIG. 31, the path switching section 30 detects each of the alarm signals, including the above-noted P-ACT signal, and executes the corresponding processing shown in FIGS. 34 through 37.

The P-ACT message in this embodiment is ignored by a terminal apparatus on a VC path which does not have a path switching function, and message generation is not performed. Therefore, in the case in which P-ACT messages are sent in the directions of both network elements (SDH NE#2 and SDH NE#5) 62 and 65 connected to the network element (SDH NE#1) 61 at the service access point A in FIG. 24, the network element (SDH NE#4) 64 at the service access point B can detect the VC path P-ACT message from one of the network elements 65, but cannot detect the other P-ACT message that passes via the PDH subnetwork and does not exist from the network element (SDH NE#3) 63.

As a result, when both paths are normal, the network element 64 at the service access point B automatically selects the SDH network path which does not include a PDH network. Because it is sufficient for the P-ACT message to take either of the two values 1 or 0, just one undefined path overhead (POH) bit is required. This enables automatic selection of a path with little jitter in an SDH network which includes a PDH subnetwork.

As described above, according to the present invention in an SDH ring network which includes a PDH subnetwork, it is possible by path switching to avoid a loss of service even in the case of a fault in the PDH subnetwork, it being possible to automatically select the route that has the better circuit quality when operation is normal and, because effective use can be made of existing PDH hardware, it is possible to provide economical network applications.

What is claimed is:

1. A path switching ring control apparatus in a synchronous (SDH) network which includes an asynchronous (PDH) subnetwork, said apparatus comprising:
   two SDH interface sections which bi-directionally interface to said SDH network;
   a receiving-side function section which demaps an SDH signal from said two SDH interface sections to a PDH signal, and which outputs said PDH signal; and which demaps an input PDH signal to an SDH signal, and which outputs said PDH signal; and
   a transmitting-side function section which maps an input PDH signal to an SDH signal and which sends said SDH signal to said two SDH interface sections as the transmission signal;
   a path switching section to which an SDH signal received at said two SDH interface sections is input, and which selects one thereof;

said transmitting-side function section comprising
   a transmission alarm detection section which monitors said input PDH signal and which, when it detects degradation of said PDH signal, generates a transmission alarm having at least SF and SD information,
   a path overhead generation section which generates path overhead information of an alarm signal from said transmission alarm detection section, and
   a path overhead insertion section which inserts the path overhead information which is generated by said path overhead generation section into the path overhead of the said SDH signal after the mapping thereof; and
said path switching section comprising
   a path switch section which selects one of the SDH signals received at said two SDH interface sections,
   a path monitor section which monitors the path overhead of the SDH signals received at said two SDH interface sections, and which, when it detects transmission alarm information having at least SF and SD information which indicates a degradation of the quality of the PDH signal on said PDH subnetwork outputs a transmission alarm detection signal corresponding to said received signals, and
   a path switch control section to which is applied said transmission alarm detection signal from said path monitor section and corresponding to each said received signal, and which performs switching control of said path switch section so as to make a select corresponding to a signal for which said transmission alarm was not detected.

2. A path switching ring control apparatus according to claim 1, wherein:
   said transmitting-side function section comprises
      a frame detection section which detects the bit position of said input PDH signal at which prescribed trace data was inserted and which generates read-in timing for said trace data, and
      a path trace section which reads in said trace data in accordance with the trace data read-in timing from said frame detection section, compares that trace data with a trace data expected received value, and which outputs a non-coincidence alarm signal when these do not coincide, and wherein
   said transmission alarm detection section further generating a transmission alarm signal which includes said non-coincidence alarm signal.

3. A path switching ring control apparatus according to claim 2, wherein:
   said path trace section, rather than performing a comparison of said trace data with a trace data expected received value, outputs said trace data as is, and wherein
   said path overhead generation section generates path overhead information of trace data from said path trace section and said transmission alarm signal.

4. A path switching ring control apparatus in an SDH network which includes a PDH subnetwork, said apparatus comprising:
   two SDH interface sections which bi-directionally interface to said SDH network;
   a receiving-side function which demaps an SDH signal from said two SDH interface sections to a PDH signal, and which outputs said PDH signal; and
   a transmitting-side function section which maps an input PDH signal to an SDH signal and which sends said SDH signal to said two SDH interface sections as the transmission signal;

said transmitting-side function section comprising
a transmission alarm detection section which monitors said input PDH signal and which, when it detects degradation of said PDH signal, generates a transmission alarm having at least SF and SD information,
a path overhead generation section which generates path overhead information of an alarm signal from said transmission alarm detection section, has a path switch function active message set for the purpose of making a passage judgment with regard to said PDH subnetwork, and generates path overhead information of said path switch function active message, and
a path overhead insertion section which inserts the path overhead information which is generated by said path overhead generation section into the path overhead of the said SDH signal after the mapping thereof,
wherein said path monitor section, rather than detecting transmission alarm information having at least SF and SD information which indicates a degradation of PDH signal quality on said PDH subnetwork, when it detects a path switch function active message for the purpose of making a passage judgment with regard to said PDH subnetwork, outputs a path switch function active message detection signal.

5. A path switching ring control apparatus according to claim 1, wherein
said path monitor section, rather than, or in addition to, monitoring the path overhead of each said SDH signal, monitors information within a virtual container of each SDH signal, and which, when it detects transmission alarm information having at least SF and SD information which indicates a degradation of the quality of the PDH signal on said PDH subnetwork, outputs a transmission alarm detection signal corresponding to each said received signal.

6. A path switching ring control apparatus according to claim 5, wherein
said path monitor section further comprises a path check section which monitors transmission alarm signals, corresponding to each said received signal, which are applied from said path monitor section to said path switch control section, and which, in the case in which each said transmission alarm signal does not have a duration of greater than a prescribed period of time, disables the switching operation of said path switch control section.

7. A path switching ring control apparatus according to claim 1, wherein
said path monitor section, rather than detecting transmission alarm information having at least SF and SD information which indicates a degradation of PDH signal quality on said PDH subnetwork, when it detects a path switch function active message for the purpose of making a passage judgment with regard to said PDH subnetwork, outputs a path switch function active message detection signal.

8. A path switching ring control apparatus in an SDH network which includes a PDH subnetwork, said apparatus comprising:
two SDH interface sections which bi-directionally interface with said SDH network;
a path switching section to which an SDH signal received at said two SDH interface sections is input, and which selects one thereof;
a receiving-side function section which demaps an input PDH signal, and which outputs said PDH signal; and
a transmitting-side function section which maps an input PDH signal to an SDH signal and which sends said SDH signal to said two SDH interface sections as the transmission signal;
said receiving-side function section comprising
an overhead detection section which extracts the SDH signal overhead from the SDH signal from said path switching section and which detects the prescribed trace information in said path overhead,
a trace memory section into which is set the path trace data, based on the path trace information detected at said path overhead detection section,
a frame detection section which detects a frame signal from said demapped PDH signal, and which generates insertion timing for the purpose of inserting path trace data into the prescribed bit positions of said PDH signal, and
a trace insertion section which, in accordance with the insertion timing from said frame detection section, inserts the path trace data from said trace memory section into the prescribed bit positions of said PDH signal; and
said transmitting-side function section comprising
a frame detection section which detects the bit position of said input PDTH signal at which prescribed trace data was inserted and which generates read-in timing for said trace data, and
a path trace section which reads in said trace data in accordance with the trace data read-in timing from said frame detection section, compares that trace data with a trace data expected received value, and which outputs a non-coincidence alarm signal when these do not coincide, and wherein
said transmission alarm detection section further generating a transmission alarm signal which includes said non-coincidence alarm signal.

9. A path switching ring control apparatus according to claim 8, wherein said path trace information is one of the path trace byte (J1), the signal fail byte (B3), and the signal label byte (C2).

* * * * *